(12) United States Patent
Chambless et al.

(10) Patent No.: US 11,697,094 B2
(45) Date of Patent: Jul. 11, 2023

(54) AIR PURIFICATION SYSTEM, APPARATUS AND METHOD

(71) Applicants: John Jerome Chambless, Santa Rosa, CA (US); Robert Paul French, Escondido, CA (US)

(72) Inventors: John Jerome Chambless, Santa Rosa, CA (US); Robert Paul French, Escondido, CA (US)

( * ) Notice: Subject to any disclaimer, the term of this patent is extended or adjusted under 35 U.S.C. 154(b) by 0 days.

(21) Appl. No.: 17/743,942

(22) Filed: May 13, 2022

(65) Prior Publication Data

US 2022/0370957 A1 Nov. 24, 2022

Related U.S. Application Data

(60) Provisional application No. 63/189,653, filed on May 17, 2021.

(51) Int. Cl.
| | | |
|---|---|---|
| *B01D 53/86* | (2006.01) | |
| *B01J 35/02* | (2006.01) | |
| *B01D 47/02* | (2006.01) | |
| *B01J 23/52* | (2006.01) | |

(52) U.S. Cl.
CPC ......... *B01D 53/864* (2013.01); *B01D 47/021* (2013.01); *B01D 53/8696* (2013.01); *B01J 23/52* (2013.01); *B01J 35/023* (2013.01); *B01D 2255/106* (2013.01)

(58) Field of Classification Search
CPC ...... B01D 47/00; B01D 47/02; B01D 47/021; B01D 53/00; B01D 53/34; B01D 53/74; B01D 53/86; B01D 53/8696; B01D 2255/00; B01D 2255/10; B01D 2255/106; B01J 23/00; B01J 23/38; B01J 23/48; B01J 23/52; B01J 35/00; B01J 35/02; B01J 35/023
See application file for complete search history.

(56) References Cited

U.S. PATENT DOCUMENTS

| 5,814,288 | A | 9/1998 | Madden | |
|---|---|---|---|---|
| 8,926,937 | B2 * | 1/2015 | Zhong | B01J 31/065 |
| | | | | 423/592.1 |
| 2017/0291137 | A1 | 10/2017 | Colley | |

FOREIGN PATENT DOCUMENTS

| EP | 0777591 B1 | 6/1999 | |
|---|---|---|---|
| WO | WO-9422558 A1 * | 10/1994 | ............. A47L 9/181 |

OTHER PUBLICATIONS

Machine translation of WO 9422558 A1, which was published on Oct. 13, 1994. (Year: 1994).*
Fren, Controlled Nucleation for the Regulation of the Particle Size in Monodisperse Gold Suspensions, Nature, vol. 241, pp. 20-22, 1973.

* cited by examiner

*Primary Examiner* — Natasha E Young
(74) *Attorney, Agent, or Firm* — Edward S. Sherman

(57) ABSTRACT

A method of purifying air polluted by smoke and fumes, such as from wildfires and other hazard, may deploy a series of fluid filled vessels that act as filters to trap and/or neutralize components that would foul an aqueous suspension of gold nanoparticles that is effective in converting toxic carbon monoxide to carbon dioxide. Non-toxic fluids may be used. As the gold nanoparticles are effective in a basic solution, the solution may contain a visible pH indicator or an apparatus that deploys the method may continuously monitor the pH thereof.

9 Claims, 19 Drawing Sheets

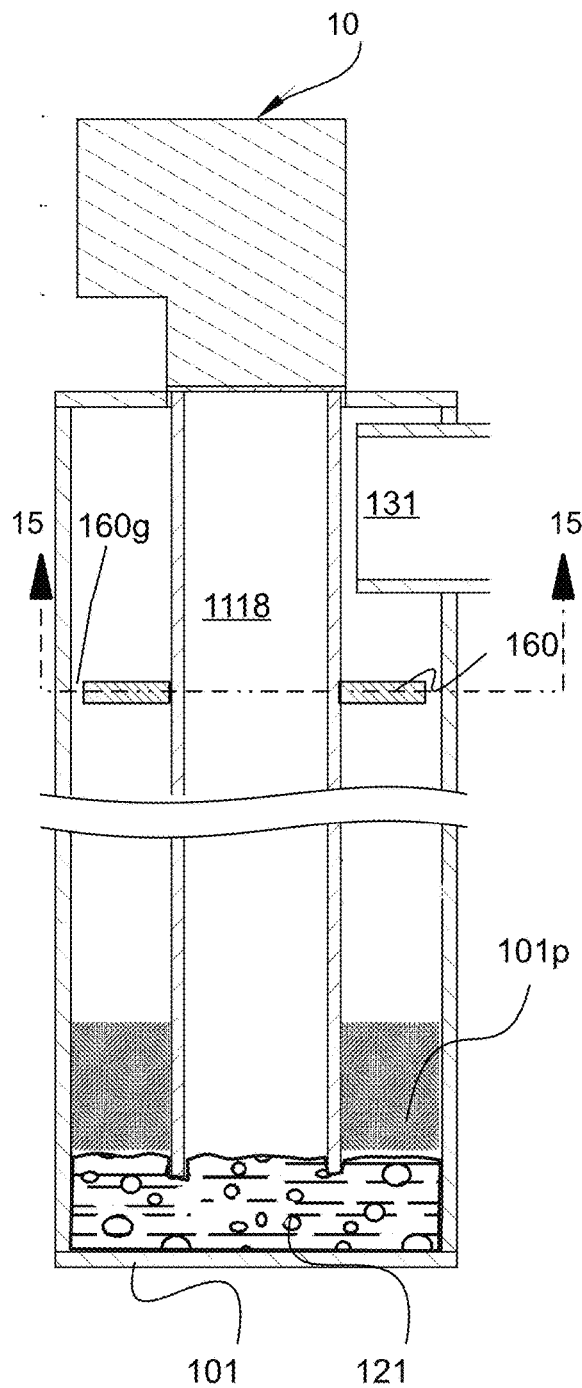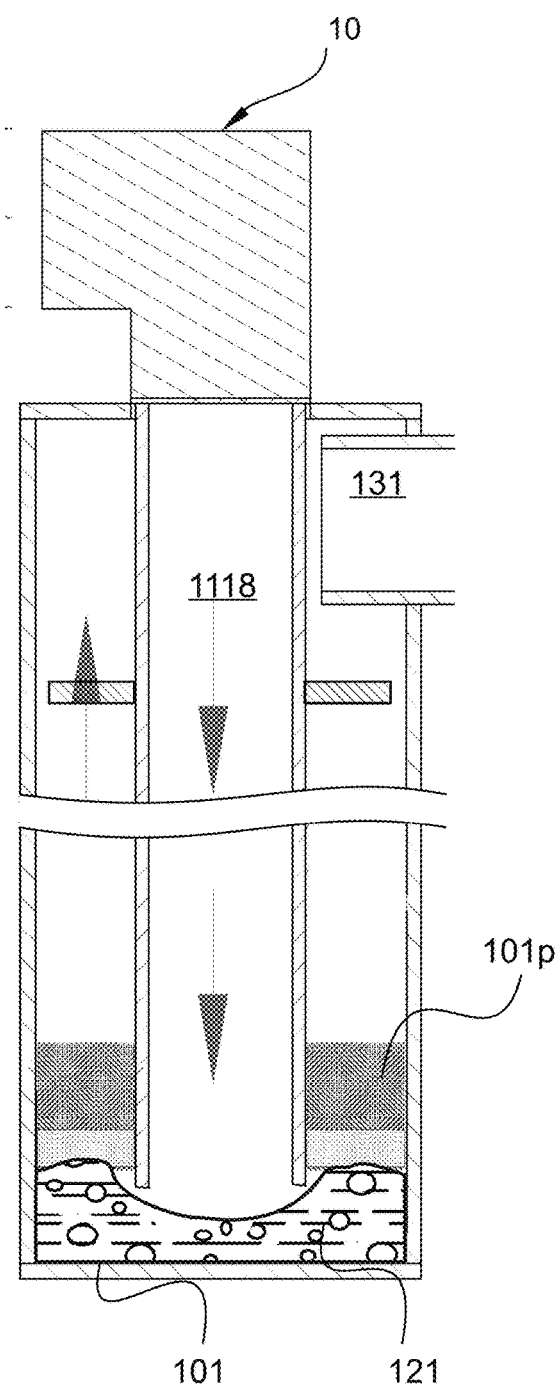

AIR PURIFICATION SYSTEM, APPARATUS AND METHOD

CROSS REFERENCE TO RELATED APPLICATIONS

The present application claims the benefit of priority to the US provisional patent application of the same title that was filed on May 17, 2021, having application Ser. No. 63/189,563, which is incorporated herein by reference.

BACKGROUND OF INVENTION

The field of inventions is air purification, particularly the remediation of indoor air contaminated by wildfires, and personal protective equipment for outdoor works.

The growing instability of the climate caused by increasing accumulation of "greenhouse gases" in the atmosphere threatens human health in multiple ways. The rising average temperatures causes some regions of the word to have a hotter climate with less precipitation. The last half decade has produced a dramatic expansion in wildfire events worldwide as a result of rising temperatures and dryer vegetation in many locations. Fire season has extended from the fall to almost year-round in some regions. Stronger winds have made such fires expand rapidly, pushing smoke and other forms of air pollution into suburbs and cities generally remote from the wilderness and exurbs that are at more direct risk of conflagrations. Conditions in the Western United States, Australia and Southern Europe have become particularly acute.

There are several unique health hazards to first responders and evacuating residents, as well as remaining support workers, from the fumes and particulate matter created by such fires. However, depending on the nature of the materials burned or incinerated, as well as the geographic extent of the plumes, and the concentrations of hazardous particulate and gaseous or vaporized species occupants of ordinary households, schools and workplaces are also exposed to increasing health risks. When wildfires consume vehicles, homes and other infrastructure toxic fumes may also include combustion products from rubber, synthetic plastics, resins, and paints, as well as heavy metals. However, fine particulate matter remains the greatest health hazard, as does carbon monoxide which binds to hemoglobin and limits respiratory capacity.

The US Environmental Protection Agency (EPA) has taken note of these hazard and sponsored a challenge competition citing the following background:

"Fine particulate matter (PM2.5), a major pollutant found in smoke from fires, has been linked to respiratory and cardiovascular health effects including ischemic heart disease, stroke, cardiovascular mortality, and exacerbations of asthma and chronic obstructive pulmonary disease. Current public health advice for protection from smoke exposure during wildfires is to stay indoors, preferably in a "clean room" with filtered air, close windows, and doors, and minimize physical exertion. However, current air cleaning technologies for indoor air have multiple limitations that prevent their widespread use and adoption, including the cost of purchase, operation, and maintenance as well as dependence on electrical power, which can be disrupted by wildfires or rolling blackouts. In addition, wildfires often occur in the summer and early fall in regions of the United States where many homes do not have air conditioning, so closing windows can lead to very high indoor temperatures."

Blackouts may occur frequently in fire season and during "red flag" events when high winds threaten the integrity of high voltage power distribution, which when damaged will ignite sparks spawning deadly fire storms. Hence, any systems for air purification ideally consumes little power and can run off storage batteries or small solar photovoltaic arrays.

In addition to PM 2.5 hazards, wildfires pollute the air with soot and all size of burned and partially burned particulate as well as large quantities of carbon monoxide (CO). CO can readily seep into homes, as can soot and PM 2.5.

According there is a need to remediate air inside homes cost effectively, using equipment that can be battery powered.

There is also a need to remediate air inside vehicles cost effectively, using equipment that can powered by car batteries.

There is also a need for improved personal respirators that can remove CO from air cost effectively, using equipment that can powered by portable/wearable batteries.

The above and other objects, effects, features, and advantages of the present invention will become more apparent from the following description of the embodiments thereof taken in conjunction with the accompanying drawing.

SUMMARY OF INVENTION

In the present invention, the first object is achieved by providing a process for remediating air comprising the steps of forcing contaminated air into an oil filter, directing air that exits the oil filter into an alkaline fluid, directing air that exits the alkaline solution into a catalytically active fluid that contains colloidal gold nano particles (AuNPs) dispersed in an alkaline aqueous solution, directing air that exits the catalytic active fluid into an acidic solution that neutralizes alkali wherein purified air exits the neutralization filter.

Another aspect of the invention is a process for remediating air comprising the steps of forcing contaminated air into an oil filter, directing air that exits the oil filter into an alkaline fluid, directing air that exits the alkaline solution into a catalytically active fluid that contains colloidal gold nano particles (AuNPs) dispersed in an alkaline aqueous solution wherein at least partially purified air exits the catalytically active fluid.

Another aspect of the invention is a process for remediating air in which contaminated air is forced into the oil filter by a first fan and the alkaline components of air that exits the catalytically active fluid are one of removed or neutralized and then dispersed by a second fan.

Another aspect of the invention is such a process for remediating air in which contaminated air is forced into the oil filter by a first fan and purified air is drawn out of the acidic solution by a second fan.

Another aspect of the invention is any such a process for remediating air in which the oil in the oil filter comprises a mixture of oils selected from the group consisting of food grade oils, unsaturated oils, monounsaturated oils, sesame, flaxseed, hemp, canola, olive, avocado, and safflower oil.

Another aspect of the invention is any such a process for remediating air in which the alkaline fluid comprises a slurry of one of hydroxides, oxides, carbonates and bicarbonates of magnesium or calcium in water that is buffered by at least one of a mineral acid and a water-soluble organic acid.

Another aspect of the invention is any such a process for remediating air in which the acidic solution comprises at least one acid organic acid selected from the group consisting of citric acid, malic acid, tartaric acid, and ascorbic acid.

Another aspect of the invention is any such a process for remediating air in which the oil filter is operative to remove particulates that contact oil in the filter and the oil is operative to dissolve volatile organic compounds from said particulates and air that at least one of percolates the air as bubbles through the oil and passes the air through a porous medium that is at least partially covered by a film of the oil.

Another aspect of the invention is any such a process for remediating air in which air entering the alkaline fluid, catalytically active fluid and the acidic solution percolates as bubbles through each of the fluids and the acidic solution and air that emerges from the fluids and the acidic solution as bubbles that have coalesced then passes through a porous medium at least partially covered by each fluid and acid solution.

Another aspect of the invention is any such a process for remediating air in which the catalytically active fluid comprises at least some AuNPs that are not agglomerated and have a particle size between about 10 nm to about 30 nm and a colorimetric pH indicator.

Another aspect of the invention is an apparatus for remediating air comprising one fan, a first vessel for receiving air from the atmosphere to be cleaned that contains a fluid oil composition, in which the air from the fan is directed to contact the fluid oil composition to remove particulates and dissolve volatile organic compounds in the air and the particulates that contact the fluid oil composition, a second vessel for receiving air from first vessel that contains a first alkaline fluid, in which the air is directed to the second vessel and is dispersed through the first alkaline fluid, a third vessel for receiving air from second vessel that contains a second alkaline fluid that has gold nanoparticles suspended therein, in which the air is directed to the third vessel and is dispersed through the second alkaline fluid, a fourth vessel for receiving air from the third vessel that contains an acid solution to neutralize any alkaline fluid that enter with the air in which the air is directed to the fourth vessel to be dispersed through the acid solution, in which the at least one fan is operative to provide air to the first vessel so that purified air exits the fourth vessel.

Another aspect of the invention is such an apparatus for remediating air wherein one or more of the second, third and fourth vessels contains a porous packing material that at least one of extends into the fluid or solution therein and is disposed above the fluid or solution such that air moved by the at least one fan will cause at least some of the fluid or solution to coat at least a portion of the porous packing material.

Another aspect of the invention is any such apparatus for remediating air that further comprises a means to prevent the fluid or solution in at least one of the vessels from flowing into at least one of the other vessels and the one or more fans.

Another aspect of the invention is any such apparatus for remediating air in which the first vessel contains a porous packing material that is disposed at least partially above the fluid oil composition such that air directed by the one or more fans will cause at least some of the fluid oil composition to coat at least a portion of the porous packing material.

Another aspect of the invention is any such apparatus for remediating air wherein at least one of the vessels is a cylinder with a central intake tube in fluid communication at a distal ends with an outlet for air at the top of another vessel in which the distal end of the central intake tube descends proximal to the bottom of the vessel to below the level of the fluid or solution therein such that a plurality of orifices adjacent a perimeter of the central intake tube release air bubbles directly into the fluid or solution Another aspect of the invention is any such apparatus for remediating air wherein the central tube is sealed at a horizontal distal end and the orifices are distributed about the perimeter of a sidewall above the sealed distal end.

Another aspect of the invention is any such apparatus for remediating air further comprising at least a second fan which disperses air from the fourth vessel.

Another aspect of the invention is any such apparatus for remediating air in which each vessel is sealed and isolated from vibration from the one or more fans by one or more elastomeric gaskets disposed at the top of each vessel that couples to a conduit for the flow of air to or from the at least one fan and another vessel.

Another aspect of the invention is any such apparatus for remediating air wherein at least the first vessel is a cylinder with a central intake tube in fluid communication at a proximal end with the fan to receive air and has an at least partially open distal end partially submerged below a surface of the fluid oil composition when the at least one fan is not energized.

Another aspect of the invention is any such apparatus for remediating air wherein the second, third and fourth vessels are generally cylindrical in shape and are arranged in one of an array of adjacent vessels and a concentric arrangement in which at least one vessel is in the form of an annular cylinder that receives air from another vessel which is disposed within an inner cylindrical portion thereof.

Another aspect of the invention is an apparatus for remediating air comprising a series of vessels interconnected with a manifold that is configured with a series of subsections, 3 or more subsections being configured to disperse air exiting the top of a first vessel below a level of a fluid in a second vessel via a conduit, in which the conduit terminates in a series of perforations a first fan to direct contaminated air into the manifold, second fan to withdraw purified air from the manifold, and a means to prevent fluid in the second vessel from flowing in the first vessel via the conduit.

Another aspect of the invention is an apparatus for remediating air that further comprises one or more sensors to determine one of the pH and fluid level in one of the first and second vessels, at least one reservoir containing a second fluid, at least one pump in fluid communication with the reservoir and the at least one of the first and second vessels, and a controller in signal communication with the one or more sensors that is operative to energize the at least one pump to withdraw the second fluid from the reservoir to adjust one of the pH and fluid level in one of the first and second vessels.

The above and other objects, effects, features, and advantages of the present invention will become more apparent from the following description of the embodiments thereof taken in conjunction with the accompanying drawings.

BRIEF DESCRIPTION OF DRAWINGS

FIG. 7A is a side cross-section elevation view of the embodiment of the apparatus in FIG. 6, whereas

FIGS. 10A and 10B illustrate in expanded cross-sectional elevation view of a preferred embodiment of the conduit entrance portal in the first vessel relative to the oil level when the fans are off (FIG. 10A) and energized (FIG. 10B)

FIG. 11A is a cross-sectional elevation view of the first vessel in an alternative embodiment, whereas FIG. 11B is a cross-section plan view thereof the indicate the potential fluid level in the first vessel is tipped over.

FIG. 16A is a cross-sectional plan view of another alternative embodiment, whereas

FIG. 18A-E illustrate a variant of the embodiment of FIG. 17 in which FIG. 18A is a plan view showing the respective lateral placement of vessels, which are shown in cross-sectional elevational view in FIG. 18B-D through the center of each vessel, whereas FIG. 18E is a partially transparent perspective view of the variant.

DETAILED DESCRIPTION

Figure 1:
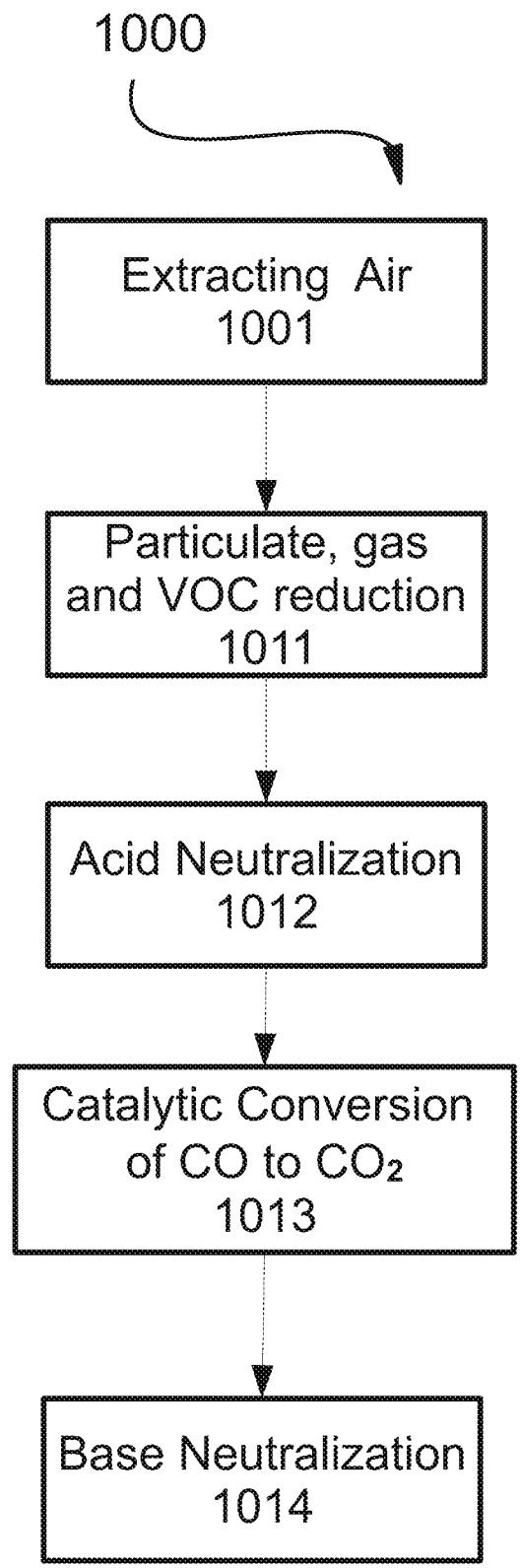
FIG. 1 is a schematic flow chart for a process for air remediation.

Referring to FIGS. 1 through 19, wherein like reference numerals refer to like components in the various views, there is illustrated therein a new and improved Air Purification Process, generally denominated 1000 herein. Furthermore, the Air Purification Process 1000 is practiced by a unique system and apparatus generally denominated 100 herein.

Aspects of the innovation are a novel apparatus and process steps for removing harmful and hazardous particulate matter and gases from air polluted by combustion and pyrolysis of carbonaceous materials, producing purified, oxygenated, and humidified air to breathe.

The method or process 1000 generally involves scrubbing polluted air by means of blowing air through a series of packed columns, containers or vessels, which act as filter, containing various liquids to trap, chemically neutralize and ultimately catalytically oxidize any toxic carbon monoxide into carbon dioxide.

An effective and efficient catalytic conversion method has been discovered for transforming carbon monoxide into carbon dioxide using a colloidal gold suspension, with the final process producing more oxygenated and humidified air, which is safe and healthy to breathe, particularly during wildfire events.

Process 1000 may have three to four distinct steps of physical separation or chemical transformation that occur sequentially, each of which occur in a separate vessel, container or filter that form part of the inventive apparatus 100.

In a first step 1001 a fan 10 may be used to direct, blow or push or propel polluted air through one or more of vessels 101, 102, 103 and optionally 104 which are connected in fluid communication of by one or more pipe, channel, tube or conduits so that polluted air become progressively purified as it percolates or otherwise interacts with fluid in the vessels. That is vessel 101 has an input port 118 of the air blown or direct by the fan 10 into the oil 121 in vessel 101 and an output port 131 of air exiting the vessel 101 that is directed via a pipe, tube, channel, or conduit 2118 that terminates in an entrance port 218 in the next vessel 102. The entrance port 218 for vessel 102 is preferably configured to emit air bubbles below the surface of the fluid 102*l* therein. Partially purified air thus exits vessel 102 after percolating through the fluid 102*l* therein via exit portal 2131. Partially purified air exiting via exit portal 2131 flows into the conduit 3118 which then extends downward into vessel 103 to an entrance port 318 to then percolate upward through a catalytically active colloidal gold suspension 103*l* therein. Then partially purified air from vessel 103 exits via exit port 3131 at the top of vessel 103 into conduit 4118. The conduit 4118 then extends downward into vessel 104 to provide for the partially purified air to percolate upward through the solution 104*l* therein from the entrance port 418 below the fluid 104*l* level. Purified air is then exhausted for breathing at the exit port 4131 of vessel 104, which is preferably drawn out and dispersed by second exit fan 10. In some embodiments, a fan 10 may be interposed between each exit port and the conduit leading to the next vessel, such as on the top of each vessel.

In step 1011, which takes place in vessel 101, may generally deploy a conventional oil bath filter that is deployed to remove large dust and ash particles as well as any fat-soluble, hydrophobic materials which include, but are not limited to carbon black and soot, polycyclic aromatic hydrocarbons (PAHs), and volatile organic compounds (VOCs), physically trapping particulate and absorbing VOC's.

In step 1012, which takes place in vessel 102 the fluid 102*l* is optionally an aqueous solution and suspension or slurry of buffered alkaline minerals to remove hydrophilic, water-soluble, acid-forming materials such as fine particulates and gases. Similar processes are used in flue gas de-sulfurization.

It should also be appreciated that nascent oxygen gas can be formed from ozone present in the smoke. The ozone reacts in the alkaline suspension or slurry 102*l* in vessel 102 to auto decompose and produce oxygen gas.

It should also be appreciated that steps 1011 and 1012 are effective in the removal of soot, tar and resin type fat-soluble components from wildfire smoke that would otherwise deactivate the gold nanoparticles that act as an oxidation catalyst in step 1013. Not wishing to be bound by theory, it is currently believed such de-activation occurs due to the agglomeration of the nanoparticles by reaction and/or chemosorption on surfaces thereof.

In step 1013, which takes place in vessel 103, the fluid is a colloidal gold suspension 103*l*, and more specifically an alkaline aqueous suspension of conventional colloidal gold with a median size of about 20 nanometers, which will be referred to as gold nanoparticles (AuNP). AuNP's are highly reactive with the capacity to catalyze chemical redox reactions at room temperatures. Not wishing to be bound by theory this is currently believed to be due to their unencumbered ability as a mobile, homogenous catalyst to react with other AuNPs. Preferably, all the AUNPs have the same spherical shape of a metallic, 20-sided polyhedron with 30 straight edges and 12 sharp corners or vertices being the possible reaction sites of a platonic solid called an icosahedron.

In optional step 1014, which takes place in vessel 104, a final wash in citric acid and Vitamin C acidified water as solution 104*l* is used to neutralize any residue alkaline materials that may carry over from vessel 103, as well as to humidify the now scrubbed air in the healthiest manner. Finally, purified air is vented to the surrounding atmosphere in via output portal 140 of the second fan 10, or last fan 10 when more than 2 fans 10 are deployed.

Step 1014 may be optional in some implementation of the innovations disclosed herein when any alkaline spray or aerosol that may exit from vessel 103 is diminished sufficiently by other means, such as condensation filters, plates or simply the extended lengths of the U-shaped tube 106 disclosed in other embodiments. Such means may include cartridge filters or filter media that contain reactive solids that can neutralize basic fluids, such as a physical barrier that can trap crystalline organic acids described in other embodiments, such that the reaction occur on the surface of the crystalline acids that are trapped or similarly encapsulated.

Other aspects of the innovations may include various electronic control devices and switches to operate the fan 10 or multiple fans, plus a water reservoir 105 to replace any water used in the chemical reactions of the process 1000 and any water vapor lost in the process 1000 of humidifying the ambient air during operation of the apparatus. Accordingly, the apparatus 100 may include in some embodiments the control system 200 illustrated in FIG. 2 in which a controller 205, such as a computer, microprocessor or programmable logic controller (PLC) that is in signal communication with one or more sensors 206 having a transduction coupling to the fluid in at least one of the vessels 101, 102, 103 and optionally vessel 104 for determining if the media or reactant therein is depleted and signaling the same via an optional user interface 210. When any of one or more sensors 206 determines if a vessel is low in water, the control system 200 is programmed to be operative to energize a pump 105*p* to deliver water to the vessel via the valve(s) 105*v* which are simultaneously opened by the controller 205. The control system 200 may also energize and de-energize the fan(s) 10, such as via the user interface 210, each which may be powered by separate or common power supplies 300. The common or separate power supplies 300 are preferably a rechargeable battery, such as a lithium-ion battery, or for use in vehicles the power supply 300 is optionally the vehicles energy system. For example, in a passenger car this is usually a 12V control system, and the apparatus 100 may have a power cord compatible with automotive passenger compartment power outlets. However, in fire engines and emergency vehicles it may be desirable to integrate or hard wire the controller 200 directly to the vehicle controller or energy supply system(s).

In preferred embodiments, each vessel 102, 103 and 104 contains a sufficient mass of the chemical reactant sustain the purification process 1000 for long periods of time as opposed to the physical limitations of mass as experienced by other air pollution abatement devices such as, but not limited to, HEPA filters, adsorbents such as activated carbon, zeolites and alumina, electric precipitators, photocatalytic reactors utilizing UV light, ozone or plasma arc. In the apparatus 100, purified water is the primary consumable, with purified and oxygenated air with room humidification and evaporative cooling being the result, which is a most welcome result during a wildfire event or stuck in traffic. Water for restoring the content of vessels 102, 103 and 104 is optionally held in another reservoir like 105, even if the fluid level in each vessel is intended to be manually restored.

Figure 2:
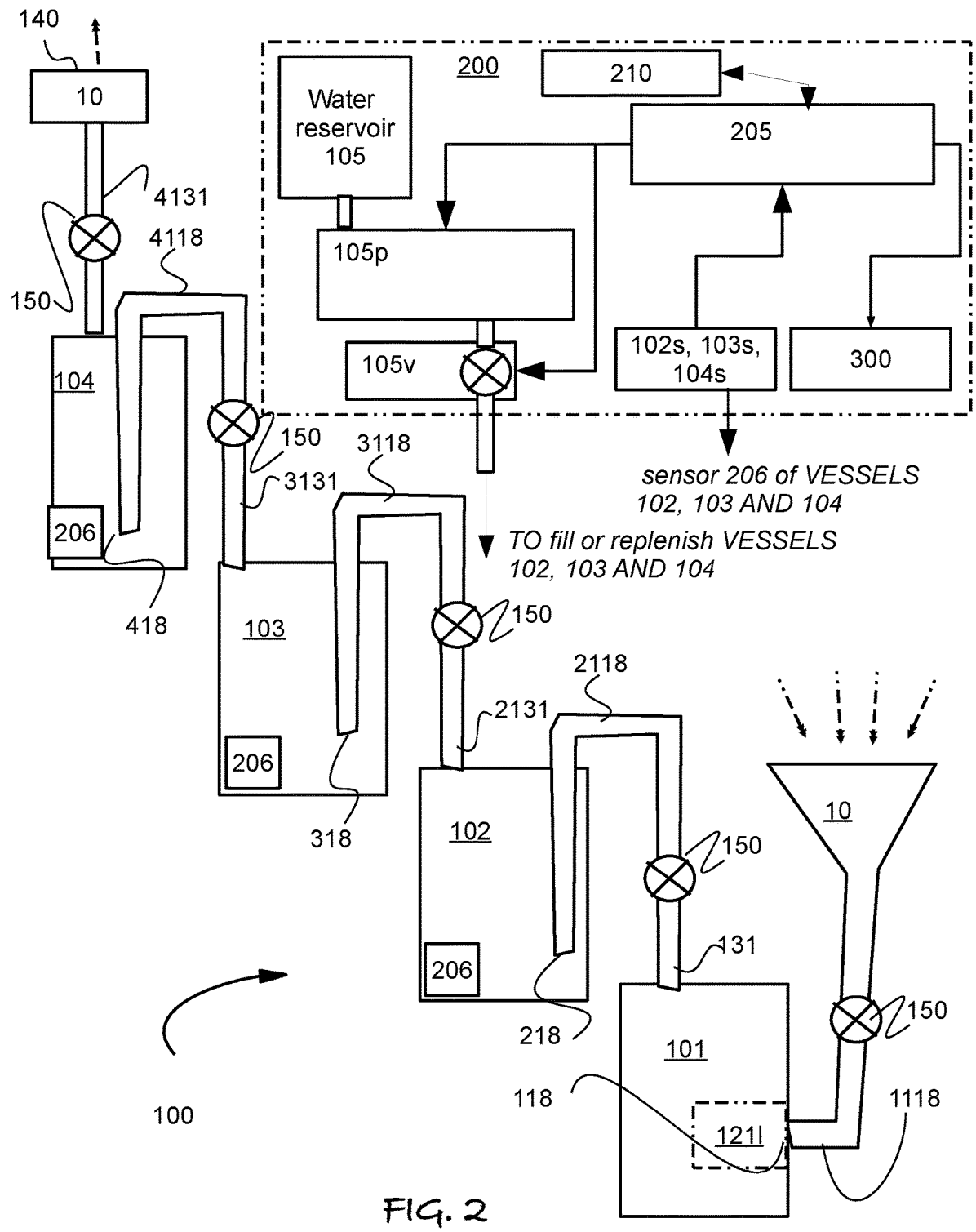
FIG. 2 is schematic system diagram of the components that may be deployed in the process of FIG. 1.

It should be appreciated that the physical arrangement of components in FIG. 2 is purely schematic for the purpose of illustrating the components of the various embodiments discussed in further detail below.

Each chamber or vessel 102, 103 and 104 in which the air mixture is then entering from the previous vessel via exit ports 131, 2131 and 3131 respectively is intended to introduce air mixture to enhance the next stage of refinement by the reactive solution and media therein. Ideally, the entering air mixture is dispersed as very fine bubbles as it enters the fluids in each vessel at the entrance ports of conduits 2118, 3118 and 4118. Thus, each of the conduits 2118, 3118 and 4118 have one or more terminal orifices as the entrance port for air below the fluid media in the vessel. The terminal orifices 2118*o* are preferably much smaller than the conduit diameter and have a combined area of much less than the circumferential area, as illustrated for conduit 2118 in FIG. 8A. This reduction in area increases the air pressure at each orifice allowing the air to overcome the restraining force of the fluid mass and any capillary forces at the orifice permit, and thus continuously exit the conduit as a stream of bubbles. Various porous media or packing can be used to at least partially fill the fluid as well as extend upward above the quiescent fluid level to extend the air liquid interface over the packing. The combination of orifices of reduced size and total area in the termination of conduits, as well as the packing can be selected to vary the size of the bubbles that percolate upward in the fluid in each vessel 102-104. The vessels and the volume of the fluid therein can thus be sized such that the bubbles have a sufficient residence time in the reactive fluids to complete the desired reaction to remove the volume of the likely pollutants. Porous media or packing that extends above the fluid may be the same or different that packing within the fluid. Porous media that extend above the fluid may provide additional surface area between the liquid film on the media, and rising bubbles as they coalesce into a continuous phase to continue to purify the air. The porous media above the fluid can be selected for its affinity for the fluid to promote upward wicking and present a large liquid surface area within a vessel.

Partially purified air enters the vessel 102-104 from the entrance port of the conduit below the fluid level in the vessel, the air will thus percolate as bubbles through the fluid therein. The entrance port below the fluid level is preferably divided in some way achieve a reduced gas bubble size to provide efficient reactions as the bubbles rise to the top of the vessel before exiting via the exit portal at the top of the vessel. A wide variety of porous media or packing may be used to achieve a desired gas bubble size to provide efficient reactions as the bubbles rise to the top of the vessel before exiting via the exit port. Such packing or media is optional fibrous and non-fibrous filter materials, metal or steel wool, fabrics, and non-woven fabrics, as well as porous films with holes formed by punching or laser etching, and metal mesh or foils with etched holes. The packing should be inert with respect to the fluid composition in the vessel but can also optionally be reactive to contaminants that may be desirable to remove. The vessel volume and height can be modified relative to bubble size to provide a sufficient residence time to complete the intended chemical reaction. The apparatus 100 may include additional vessels that provide similar reactive filtration of gas in a liquid medium or include physical barrier filters as need to abate additional and location specific hazard, such as fire at chemical plants and public utilities that may release a quite different profile of toxic compounds than wildfires.

Detailed Working Conditions of Each Process Step

Liquid-Filled Vessel 101: Oil Bath Filter

Oil bath filters are no longer commonly used and no current commercially produced car, truck, farm tractor or industrial piece of equipment uses oil bath filters. Small oil bath filters are currently produced and sold for vintage autos and farm tractors along with off-road enthusiasts or motorized applications in a high dust environment. Large, industrial, oil bath filters are sized for many applications.

Although an oil bath filter is a physical method of filtration with less efficiency than filters based on fibers, oil bath filters are better suited to high dust and smoke environments, due to their capability to physically trap large particulate matter and dissolve fat-soluble components present in smoke-laden air into a sticky, viscous liquid, instead of filtering through layers and layers of dry fibers with exceeding smaller and smaller openings called pores, which can easily be clogged or "blinded" as is known to those experienced in the art.

An oil bath filter is simple to make and operate in that air is blown directly down onto the surface of an oily liquid, the air flow at the liquid interface is forced to change direction very quickly and radically, with air now flowing in opposite directions at the liquid interface. Some particles may flow into the oil and become trapped in this viscous fluid, while particles with certain amount of mass may lose their momentum and unable to accommodate the change in direction, fall out of the air flow due to gravity, and also become trapped in the viscous liquid and physically removed from the air flow. Trapped particles are thus filtered out from the air that flows into subsequent vessels 102, 103 and 104, and will not interfere with the purification processes therein. The oil filtration method may be particularly advantageous, because unlike a dry, fiber-based filter, it will not quickly and easily become clogged by trapped particulates. However, the fan 10 in the embodiments of FIG. 3-5 may draw air through the other vessels 102-104 as it pulls air below the surface of the oil or oil mixture 121 or through an oil saturated filter medium.

To make the oil bath filter in vessel 101 and all the reactions vessels 102, 103 and 104 of the apparatus 100, coarse packing material 101p is within the air flow column below the exit port 131 to provide an increased surface area for gas-liquid contact. Air flow, depth of liquid, packing material and height of reaction column are balanced, so that the oil or oil mixture 121 undergoes violent bubbling action, but not so much movement that liquid is lifted up and aspirated out of the reaction vessel 101 into the next reaction vessel 102. As is generally known to those skilled in the art, the air flow is preferably balanced against height of liquid movement so as to prevent liquid passing over into the next vessel.

The packing material is not necessarily a fibrous filtering medium, but rather any suitable support structure for the gas-liquid interface. Particles need not be trapped by the media itself, but the oil or oil mixture 121. Any number of materials for packing materials are suitable as long as they are chemically inert in oil and aqueous alkaline solutions/suspensions, commonly called a slurry in the art, and possessing openings coarse enough to allow the free movement of bubbling gases and liquids.

In the various embodiments illustrated in FIG.'s the packing material is designated by the column reference number, followed by the letter "p," whereas liquid that is displaced into the packing material is designated by the column reference number, followed by the letter "l." Thus, when the fan 10 is not energized there may be space between the packing material 101p and the bottom of vessel 101, the liquid oil 121 may fill that space before partially coating the reticulated foam or other packing material.

Materials such as stainless-steel wool, non-woven synthetic fibers and reticulated plastic foam are currently believed to be capable of working equally well as packing, providing that the air/liquid mixture can move freely through the medium. A currently preferred embodiment is a reticulated foam filter media commonly used in fish aquariums. An example is manufactured by Spectrum Brands, 3001 Commerce St., Blacksburg, Va. 24060, model #46798190172.

However, it may be less desirable to use a porous medium with the smallest possible openings, but rather to allow large dust particle to freely move within the structure to avoid clogging the pores in the packing medium. Small is not always better, especially when working with potentially large dust particles and tarry, resinous materials commonly present in smoke which can clog high efficiency fiber-based filters. Alternatively, vessel 101 may deploy a physical filter medium such as cellulosic, woven, or non-woven fiber that are surface saturated with oils. A filter medium may also be configured so that the oil forms a coating rather than a continuous liquid pool in the vessel 101, such that some particles can be trapped in the media, rather than the liquid pool at the bottom of the vessel 101, and the oil dispersed on the medium can absorb volatile organic compounds. flowing through and over the media.

Filters or oil filters likely to also be suitable are disclosed in the following US Patent documents that are incorporated herein by reference: U.S. Pat. No. 2,011,303A Air cleaner screen, 1934; U.S. Pat. No. 2,238,280A automotive air cleaner, 1938; U.S. Pat. No. 2,180,411 air cleaner, 1939; U.S. Pat. No. 2,509,510A Oil bath air cleaner, 1946; U.S. Pat. No. 2,966,231A Stack type oil bath filter, 1960 and U.S. Pat. No. 3,264,804A Oil bath air cleaner, 1963.

As the various embodiments are intended to beneficiate polluted air, making it safe and breathable by humans, as well as other living organisms, it is preferable that vessel 101 only contains food grade vegetable oils as fluid or oil 121 which are liquids at room temperature, of sufficient vapor pressure so as to not volatilize during the operation of the apparatus 100.

Saturated oils are molecules, the simplest of fatty acids, which are effective in reacting with and dissolving organic, fat-soluble, hydrophobic smoke constituents, including, but not limited to carbon black, soot, polycyclic aromatic hydrocarbons (PAHs) and volatile organic compounds (VOCs).

Saturated oils are the most chemically unreactive of available oils. These oils would include, but not be limited to butter, ghee, lard, tallow, and coconut oil. A certain amount of saturated fatty acids are desirable in the oil, as an ingredient of the oil mixture, but the preferred oil ingredient would include other types of fatty acids as well.

Monounsaturated oils have an increased amount of reactivity and usefulness in the various embodiment of the innovation due to the presence of one unsaturated, double bond between carbon atoms. This structure is a straight line bent in the middle, so is more reactive as it allows a reaction site with which the oil may react with and bond to fat-soluble and hydrophobia smoke constituents, removing said pollutants from air. The most common monounsaturated fatty acid in plant-based oils is oleic acid, being of the highest concentrations in olive, avocado, and safflower oil.

These oils, along with the high-oleic safflower and sunflower currently available commercially, along with any and all vegetable seed and nut oils, are all suitable for this step in the process 1000. However, in many aspects of the innovative process 1000, the preferred ingredient is not the most concentrated, most reactive, or most extreme in any measurable variable. Instead, the ingredient, which is closest to the median, the most common denominator within a range of possibilities, achieves a balance with all other possibilities is preferred. The oil or oil mixture 121 with the greatest diversity of fatty acid types is the preferred ingredient since polluted air can exist in many possible combinations, therefore the oils with the most diversity in its make-up is preferred in all potential situations when the various embodiment of the apparatus intended as a primary or secondary source of safe and breathable air.

Sesame oil is the preferred vegetable for this reason, being as it is the most balanced of fatty acid types, including the more reactive poly unsaturated fatty acids (PUFAs), mono-unsaturated oil and saturated oils in the most equal proportions of any plant-based oil. Sesame, flaxseed, hemp, and canola oil, and peanut oil are examples of these oils which have the structure of a straight line that is bent in the middle and then bent again to make a more complex shape of a curve or hook, similar to a shepherd's crook.

It is currently believed this shape allows for multiple reaction sites, which is beneficial, but excess reactivity can result in the oils becoming "dried" or "fixed" as varnish-like polymerized substances. Again, the preferred oil for the vessel 101 should contain a balance of all oils to be the most effective. Sesame oil is therefore the preferred choice due to its more balanced nature.

FIGS. 10A and B illustrate a preferred embodiment of the partially liquid filled vessel 101 in which the end of the conduit 118 is only slightly below the level of the oil 121 when the fan 10 is not energized (FIG. 10A). When the fan 10 is energized, as shown in FIG. 10B, the pressure of the air forces the oil 121 into the porous packing material 101*p*, forming a shallow depression or crater in the center of the oil 121 that extends laterally past the end of the exit port 118, which in preferred embodiments is a central inlet tube terminating in an opening 118*o* just below the surface of the oil 121. It is believed that in the preferred embodiment of FIGS. 10A and 10B, that the larger particle of soot entering through port 118 will hit and stick to the oil 121. More specifically, the entrance portal 118 at the bottom of conduit 1118 is preferably about ⅛" (3 mm) below oil 121 level. The space above the oil 121 and surrounding the conduit 1118 is at least partially filled with a reticulated foam packing material 101*p* which may float or otherwise by partially disposed on or in the oil 121. A more preferred reticulated foam has 5-15 pores per inch, and is preferably either a polyethylene, polyurethane or co-polymer of ethylene and urethane such as the 10PPIETIC reticulated foam available from H—O Products Corporation of Winstead, Conn., US. FIG. 10A illustrates the oil 121 level as flat and slightly above the entrance port 118 in conduit 1118 just above the bottom of vessel 101 when the fan 10 is not energized. In FIG. 10A, energizing the fan 10 pushes the level of the oil 121 down immediately below the entrance port 118, but the oil 121 when the air pressure from the fan 10 is sufficient the oil 121 rises up in the annular region of vessel 101 that surround the conduit 1118, allowing in to flow into the packing material 101*p*. While the larger soot particles will be trapped on hitting the oil 121 below the conduit 1118, the finer particles and oil soluble organic decomposition products will more readily disperse or dissolve in the film of oil 121 that coats the reticulated foam pores, or equivalent surface on different packing materials. Thus, the first vessel 101 is cable of trapping larger soot particles down to the finest particulates, as well as soluble compounds chem-absorbed or dissolved therein.

Liquid-Filled Vessel 102: An Aqueous Solution and Suspension or Slurry of Buffered Alkaline Mineral.

The objective of the buffered alkaline solution/suspension, commonly called a slurry, is to physically absorb and chemically react with particulate and gaseous compounds, such as those typically found in smoke produced from combustion and/or pyrolysis of carbonaceous materials, in such a way as to attract, absorb and dissolve all hydrophilic substances that are water-soluble, acid-forming compounds into aqueous solutions. During the process step of bubbling polluted air through the alkaline slurry, particles and gases which react with water to form acids are absorbed and then neutralized with a base, being the alkaline minerals, to form a solid precipitant.

Water-soluble particles, usually metallic oxides, water soluble organic compounds and acid-forming gaseous compounds are removed from the air stream and dissolved in a liquid solution or suspension, or in some cases chemically reacted with alkaline materials to produce a final result being the formation of an insoluble precipitant, usually a carbonate or phosphate mineral compound.

A common industrial use of this classic chemical reaction is called "flue gas de-sulfurization," used on coal-fired power plants and mobile power generation equipment such as marine vessels. It is a mixture of mineral compounds which range in degree of solubility from insoluble to soluble, according to the basic solubility rules of chemistry for aqueous solutions. A buffering organic acid is used to initially acidify the slurry so that limestone dissociates into calcium ions ($Ca^{+2}$), magnesium ions ($Mg^{+2}$) and carbonate ions ($CO_3^{-2}$). Allows for the metallic ions to be available to react with incoming gaseous compounds, which continues to add acidic compounds which drive the process by continually causing the disassociation of more limestone, until all of the limestone is dissolved and reacted in the process of de-sulfurization.

When the pH falls below 7.0, as measured by pH paper or electronic devices, the alkaline slurry has exhausted its stores of limestone and more can be added to continue the process 1000 in the apparatus.

Suitable aspects and variation of such alkaline neutralization processes are disclosed in the following US Patent documents that are incorporated herein by reference: European patent EP0777519B1 Wet flue gas de-sulphuration process using limestone, 1994; U.S. Pat. No. 5,814,288, Flue gas desulfurization method and apparatus, US Department of Energy, 1998; and US20170291137A1 Method for converting lime-based wet flue gas desulfurization systems to limestone-based systems, 2018

Limestone, calcium carbonate ($CaCO_3$) and dolomitic lime which also contains magnesium carbonate ($MgCO_3$), are both insoluble in water to a large degree, but in the presence of acids, both originally present as an ingredient in this buffered solution, plus the addition of acid-forming compounds from the polluted air, the $CaCO_3$ and $MgCO_3$ can be dissolved, releasing $Ca^{+2}$ (aq), $Mg^{+2}$(aq) and $CO_3^{-2}$ (aq) ions into the water.

This process step occurs without the use of much more reactive and potentially dangerous alkaline compounds such as strong, caustic lye, sodium hydroxide (NaOH), or CaO and/or MgO which could be used as ingredients in the solution but are not for health and safety reasons. Instead of such extreme chemical reactants, many diverse reactions of lower intensity, which are safer, last longer and are more sustainable, plus can better capture and neutralize a greater range of polluting compounds is used. The innovative process depends on a diversity of chemical reactions, not relying on a single powerful reactant with potential safety issues. Instead, reactants are more preferred if they make the innovative process 1000 effective enough to accomplish the desired objective in the most safe and healthy way are chosen.

To make the buffered alkaline slurry, a glass container of appropriate size is preferred, and distilled water should be used. During the operation of the innovative process 1000, sufficiently purified may be used to replenish any lost water. Any time acids and bases are mixed together in water, an exothermic reaction can and will occur so caution is always warranted, with usage of appropriate safety equipment and procedures that would be appropriate with prior chemical knowledge of at least the high school chemistry level. The apparatus 100 preferably uses ordinary, food grade, generally recognized as safe compounds (GRAS), which are every day, ordinary chemical compounds found in many homes and places of bushiness.

The alkaline slurry may have many diverse ingredients, with which to allow for as many possible reactions to occur with as many ingredients that can safely be combined together in one reaction vessel to react with a wide range of air pollutants. There are a series of synergistic acid/base neutralization reactions which occur by constantly reacting with a constant influx of new reactants from the polluted air blowing through the liquid. Total mass of reactants gives longevity to usefulness of the slurry and the mass of limestone serves as the source of the reactant which is the limiting ingredient of the alkaline slurry. If no more limestone is available to be reacted with the acid-forming compounds in the polluted air and release $Ca^{+2}$ (aq) and $Mg^{+2}$(aq), no more precipitants can be formed. The pH then becomes more acidic, rendering the alkaline slurry no longer effective once a pH of 7.0 is attained.

$CaCO_3$, a largely insoluble carbonate, contains the primary metallic ion of the reaction, $Ca^{+2}$(aq), with magnesium carbonate, ($MgCO_3$) being the secondary source of $Mg^{+2}$ (aq) ions. An acid is added to initially disassociate the limestone.

Once the slurry has reached a pH below 7.0 with the preferred pH of at least 6.0, the dissolution of limestone is initiated. The reaction is continuing after this point due to the influx of incoming polluted air that will continue to add acidic ions with which to perpetuate the reaction, as long as limestone is available. Once the pH of the slurry reaches 7.0 and starts going lower, the alkaline slurry can no longer chemically react with air pollution and is then no better than plain water in its neutralizing ability, once the pH goes below 7.0.

As the limestone is slowly dissolved by the acids entering the slurry, the calcium and magnesium and any other metallic ions present in the air borne substances may react to commonly form carbonates, sulfates, nitrates, and phosphates. Typically, insoluble calcium sulfate ($CaSO_4$) and calcium phosphate apatite ($Ca_3(PO_4)_2$) are formed with "new" calcium and magnesium ions being liberated from the limestone reservoir as more acid-forming air pollutants are blown through the slurry.

Citric acid is the preferred acid used to buffer the alkaline slurry because it is the most commonly available, household, organic acid that is readily available anywhere that pickling/canning supplies are sold. Any other organic acid can be used, including, but not limited to acetic acid, but these acids are not commonly available or may have odors which might be offensive in an air purification device. Mineral acids such as, but not limited to carbonic, sulfuric, nitric, and phosphoric acids, can be used, but these non-metallic substances are the very acid-forming substances that this aspect of the innovation is designed to remove. It is best not to add more of these substances to the alkaline slurry.

Following is the process to produce the alkaline slurry of the innovative process 1000. The recipe is based on one liter of water, but the amounts of each ingredient including water can been scaled up to any amount as long as the given ratios and proportions are followed. Volumetric measurements are used instead of weights because measuring spoons are usually more readily available than scales. Using volumetric measurements simplifies the procedure in step 1-10 that follows:

1) Start with one liter of room temperature water in glass container, preferably distilled water.

2) Add each dry, powdered ingredient, in the order given, stirring each to mix thoroughly. Wear safety glasses. If any ingredient is splashed into eyes, flush with plain water. Exercise the same safety precautions you would when pickling/canning at home, using washing powders or any dry or liquid household chemical than is potentially harmful if splashed into the eyes or orally ingested.

3) Add the preferred amount of 2 level tablespoons of powdered limestone or chalk, calcium carbonate, $CaCO_3$. Stir. The range would be 1 teaspoon to 3 teaspoons.

4) Add the preferred of 2 level tablespoons of powdered agricultural lime or marble dust which contains both $CaCO_3$ and $MgCO_3$, and then stir. The range marble dust can be between about 1 teaspoon to 3 teaspoons.

5) Add the preferred amount of 1 level teaspoon pickling lime, $Ca(OH)_2$, also called slaked lime and then stir. The range would be ½ teaspoon to 2 teaspoons. Quicklime, CaO, could be used in the solution, but is not for potential risks to user and assembler safety reasons.

6) Add preferred amount of 2 level teaspoons of liquid milk of magnesia, $Mg(OH)_2$ and stir. Rinse spoon in plain water and dry to use again. The range would be 1 teaspoon to 4 teaspoons.

7) Add preferred amount of 1 level teaspoon washing soda, $Na_2CO_3$. Stir. The range would be ½ teaspoon to 2 teaspoons.

Washing soda is often the major ingredient in laundry detergent, but since other chemical compounds are added, including fragrances, plain washing soda is preferred. Washing soda can be made from baking soda which is heated in a kitchen oven at 400 degrees Fahrenheit for 30 minutes and allowed to cool.

8) Add preferred amount of ½ level teaspoon of baking soda, sodium bicarbonate, $NaHCO_3$. Stir. The range would be ¼ teaspoon to 1 teaspoon.

9) Add the preferred amount of 1 level teaspoon citric acid. Stir. The range would be ½ teaspoon to 2 teaspoons. Citric Acid is sold as a common pickling/canning ingredient in most supermarkets.

10) Add preferred amount of 3 squirts of the eye dropper, or 60 drops, totaling 3 milliliters of 5% Strong Lugol's solution and stir. The range would be 2 milliliters to 4 milliliters. Instead of the aqueous solution of Lugol's, ⅛ of a teaspoon of dry, potassium iodine (KI), may be used. The range would be ¹⁄₁₆ teaspoon to ¼ teaspoon.

The buffered alkaline slurry is now ready to be added to the innovative device. The amount used in the reaction depends on many variables which those skilled in the art are accustomed to balancing. The total amount of slurry in the reaction vessel, as do the amounts of all liquids in all reaction vessels depends on a combination of factors including, but not limited to: the output of the fan 10, resistance of the piping system of the device, the static pressures of the combined liquids in each reaction vessel and the necessity to prevent the liquid materials from passing from one reaction vessel into the adjacent reaction vessel. Hence, FIG. 2 also illustrates a series of one way or check valves 150 that can be deployed in each of the conduit connecting the exit port of one vessel with the entrance port of the next vessel. A large amount of reactant liquid is not expected to be required under many operating conditions, a preferred amount being approximately 2 inches deep, with a range of from 1 inch to 3 inches in depth. The total mass of the alkaline mineral compounds can easily absorb and neutralize a large volume of air polluted by combustion and/or pyrolysis of carbonaceous materials.

The mass of air pollutants, based on material balance calculation, which utilize USEPA minimum and maximum indoor PM 2.5 levels during wildfire events can be calculated and compared to the mass of alkaline materials in the process 1000 and apparatus. The mass of PM 2.5 is used as it typically makes up to 90% of smoke from wildfire events. The mass of PM 2.5 contains gaseous compounds bound to a solid particle which weigh more than the gas, which is ultimately neutralized in the alkaline slurry, but the overall, gross weight of PM2.5 gives a maximum possible amount to use in the calculations.

According to the aforementioned recent competition, the EPA Wildfire Challenge Competition, a contest to remove smoke components during a wildfire event, the indoor PM 2.5 required to be removed is taken to be a maximum of 300 micro gram per cubic meter in a room measuring 10 feet by 15 feet by 8 feet in ceiling height, totaling 1,200 cubic feet which needs to be removed within a one hour period. For a 24-hour day period, this equals 300 micro grams times 24 hours equals 7,200 micro grams per day, which equals 0.0072 grams per day. This compares to the total alkaline mineral mass in the solution of approximately 90 grams.

The total mass of calcium ions and magnesium ions, which are the principle limiting reagents in the precipitation of gaseous substances in the air to be purified, is calculated from rounded off mass measurements due to the use of simplistic volumetric measurement of solids in the process 1000, is given: 40 grams limestone, 40 grams of dolomitic lime, 5 grams of calcium hydroxide and 5 grams magnesium hydroxide.

The total amount of calcium and magnesium containing alkaline reagents equals 90 grams, of which approximately 60% by molecular weight is calcium and magnesium, which equals approximately 54 grams. This amount of alkalizing potential can be compared to the amount of PM 2.5 mass, 0.0072 grams, with associated pollutants, that USEPA literature reports as being needed to be removed from a room in one day, during a wildfire event.

Preferably the apparatus 100 contains enough total alkaline reagent mass to potentially capture and precipitate an amount of gaseous pollutants in a room for up to a theoretical period of 12,500 days. This huge length of time during which the apparatus 100 can possibly operate to neutralize air pollutants is not an exact, specific number, but a number of such large magnitude that it is easy to see the huge potential difference between conventional filtering devices which depend on a lightweight, replaceable, dry filtering system versus the liquid based, high mass pollutant scrubbing system of the innovative apparatus and process.

Liquid-Filled Vessel 103: An Alkaline Aqueous Suspension of Conventional Colloidal Gold.

The objective of the aqueous suspension containing an alkaline, colloidal gold suspension is to catalytically react with CO in oxidation/reduction reactions in order to produce $CO_2$ and possibly produce nascent, breathable, $O_2$ gas. The innovative apparatus and process 1000 uses what is called "conventional" colloidal gold particles, AuNPs, which are produced in an aqueous suspension by traditional methods by those with skill in the art comparable to high school chemistry.

Not wishing to be bound by theory, it is currently believed based on experimental results provided in Appendix 1 that gold may first catalyze a reaction that supplies a proton to $O_2$, energizing it, forming OOH. Then, in the presence of the alkaline hydroxide reacts to form COOH, which decomposes to $CO_2$ with the proton given back to the H2O again and hydroxide regenerated. This would mean that the gold is catalyzing the movement of a proton back and forth while in the presence of the hydroxide.

These potential reactions are summarized by the following chemical equations:

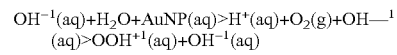

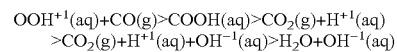

The AuNP's may range in size from about 10 nm and 30 nm, with the preferred size range being about 20 nm for the most stable colloidal suspension of AuNP.

There are several methods of producing colloidal gold that are considered "conventional." Any of these forms will operate equally well in the process 1000. Colloidal gold is also commercially available from multiple suppliers, as is a precursor gold chloride ($AuCl_3$) a preferred source is Salt Lake Metals, PO Box 200, Nephi, Utah, 84648, United States A currently preferred method follows the teaching of Fren's work in 1973 then published, Controlled Nucleation for the Regulation of the Particle Size in Monodisperse Gold Suspensions, Nature, volume 241, pages 20-22. This publication further refined the Turkevic method and ushered in a new wave of research into homogenous colloidal gold particles in aqueous suspensions. Typically, chloroauric acid ($HAuCl_4$), or gold chloride ($AuCl_3$) is reduced from a highly toxic, charged ion with an oxidation number of +3 into a metallic form of gold with an oxidation number of zero, which is safe to orally ingest.

This reduction process is due to the gaining of electrons. Oxidation and reduction reactions are central to this part of the process. The reduction of ionic gold chloride to free elemental gold is the first step in making "conventional colloidal gold." Later, these reduced gold particles with their freely moving electrons on the surface, which results in surface plasmon resonance will be central to the oxidation of CO to $CO_2$ with the evolution of nascent $O_2$.

Fren's work refined the production of mono disperse spherical gold particles which normally are formed such that the most common sized particle with the greatest concentration is always about 20 nanometers, characterized by the ruby red color due to surface plasmon resonance.

These classical, conventional methods of colloidal gold production consistently produce the spherical, monodisperse gold nano particles which are of uniform size, shape, and mass, to be used in the process. There are many different chemical reactions that can be used to make colloidal gold, including, but not limited to electrolysis. However, the most stable AuNPs use a method more in line with one underlying tenet of the preferred implementations of the innovative process 1000, which is to use the least toxic, most beneficial ingredients and methods possible at a level of skill equal to high school chemistry, for purposes of health and safety.

Besides the acidic gold chloride, the preferred method uses food grade ingredients which are readily available, glucose and maltose sugar in the form called Karo corn syrup, produced by ACH Food Companies, Inc. One Parkview Plaza, Oakbrook Terrace, Ill. 60181, and washing soda ($Na_2CO_3$). The washing soda neutralizes the acidity of the gold chloride and the reducing sugars act as reducing agents to donate electrons to the gold ions. The AuNPs formed are each made up of approximately 2,000 gold atoms aligned in a crystalline structure that has the shape of a 20-side polyhedron called an icosahedron, with the most common size of 20 nanometers.

Most people are familiar with the term oxidation, which is usually taken to be detrimental and harmful to human health, so antioxidants such as Vitamin C are supplemented. An antioxidant is another chemical name for a reducing agent, as an electron is donated by these substances. Glucose and maltose sugar are used as electron donors in this process to make colloidal gold. The final product is the safest form, most stable and catalytically active form of colloidal gold, which is also called of aurum potabile, drinkable gold.

Another preferred method is delineated as prior art on the internet discussion board owned by W. G. Peters, ww.colloidalgoldcolloidalsilverforum.org. It is unknown who is the original inventor of this method, but it has been publicly available on this internet discussion board since the inception of the discussion forum in 2013.

The method given produces 250 ml of 40 ppm colloidal gold suspension, but the quantities of all ingredients can be increased according to the following ratio and proportions into any volume desired. The quality and therefore stability of the AuNPs used in the process depend on absolutely pure, distilled water being used. Historically, the production of colloidal gold suspensions has been plagued with unstable suspensions, particles of inconsistent and useless sizes, culminating in the opinion that colloidal gold is too difficult to make consistently and too unstable to be easily produced, and overly expensive to make due to its high initial cost and prevalence of failed reactions. This opinion is incorrect and based on the defectiveness of one variable, the purity of the water used.

Production of a colloidal gold suspension starts with an individual gold atom reacting with the reducing agent in an alkaline environment, with electrons being donated to the gold ion, producing a stable gold atom with no charge. This gold atom is attracted to other gold atoms. Various numbers of atoms clump together to build a number of shapes and sizes. These clusters may function as seed nuclei for the agglomeration of increasingly gold atoms together, ultimately culminating in the most uniform shape and size of the greatest concentration, the 20 nm AuNPs with the characteristic ruby red color.

Any impurities whatsoever in the water can serve as seed nuclei for gold atoms, but the final product will not be the desired 20 nm sized, ruby red colored particle. Instead, at best, the suspension may appear milky or cloudy, but most often the suspension turns a blue or black color. Any color other than ruby red is a sign that the process went wrong, and the product is not safe, nor effective to use.

The blue and black suspensions are made of AuNPs that are 50 to 100 nm and therefore unreactive catalytically. These suspensions cannot be used in the process 1000 and must be disposed of properly. The only way to use or re-use this gold is to react it again with aqua regia, but that process is too dangerous for those skilled in the art at a high school chemistry level. Hence, the AuNP size may vary somewhat from 20 nm, but is preferably between about 10 to 30 nm.

All water used should be distilled twice and filtered through clean activated carbon to remove any volatile compounds in the water. Commercially available distilled water that is purchased from a supermarket or drugstore should be distilled again as the number of dissolved particles in the water is too high to produce consistent, high quality, safe and highly reactive colloidal gold.

Add 250 ml of double distilled water to a piece of high quality, lab glassware, sufficient in size to accommodate stirring. It is possible for ions such as boron to leach out of poor-quality glassware, ruining the process 1000. Only glass of the highest quality and cleanest condition should be used. Glassware can be cleansed with hydrogen peroxide, but the glassware must then be rinsed very well to remove any hydrogen peroxide, which being a strong oxidant, can ruin the reduction reaction. One should rinse the glassware several times with double distilled water before using. Then the following steps 1)-9) are followed"

1) Add one milliliter of stock sodium carbonate solution, being of one molar concentration, consisting of washing soda ($Na_2CO_3$). Stir with a clean glass rod. The pH should measure approximately 10.0. Vigorous shaking and gentle heat may be applied to facilitate dissolution.

2) This stock sodium carbonate solution is made by adding one level teaspoon, 3.72 grams of washing soda ($Na_2CO_3$) to a 30 ml dropper bottle containing double distilled water. The mixture can be gently heated to ensure complete dissolution. Typically, one squirt of the dropper is equal to 20 drops, or one milliliter.

3) Add one milliliter of the stock reducing agent solution. Stir glass rod. This stock reducing agent solution is made by adding equal volumes of double distilled water and Karo syrup, a reducing sugar which is a combination of a monosaccharide glucose sugar and disaccharide maltose sugar, a sugar made up of two glucose sugar molecules. Using a 30 ml dropper bottle, fill half of the bottle with Karo syrup and half with double distilled water. Gently heat and shake vigorously to facilitate dissolution. Typically, one squirt of the dropper is equal to 20 drops, or one milliliter. Such an amount of reducing agent is using the process to ensure that an excess of reducing agent is available in order to reduce any and all Au' ions (aq) that might be present, into elemental gold, Au ° metal (aq), for safety reasons.

4) Using either a clean glass eye dropper or a plastic food grade syringe, add one milliliter of 1% gold chloride, $AuCl_3$ solution, which has a pH of approximately 2.0, to the solution. Stir with glass rod.

The resulting solution should be at an approximate pH of 8.0 due to the acid/base neutralization reaction produced in the solution. The preferred pH for the reaction is 8.5 which can be attained by titration, which involves adding either more drops of acidic gold chloride or alkaline washing soda to the solution. The pH can be measured using universal pH paper or an electronic measuring device.

5) Heat the solution in a microwave, on top of kitchen stove or laboratory hot plate until the ruby red color appears. The activation temperature is less than the boiling point of water, depending on the final pH of the solution, normally being no more than 180 degrees Fahrenheit, though the solution can be boiled without detriment to the efficacy of the process 1000, except the water will be evaporated, leaving a dry powder behind, which is not effective in the process 1000.

A conventional, colloidal gold suspension of characteristic ruby red color should be the result. An excess amount of reducing solution is used in the reaction to ensure that all charged gold ions are reduced to harmless, neutrally charged gold atoms. The presence of a colloidal suspension can be evaluated using a low powered laser pointer such as used in business presentations. The suspended gold particles are large enough to see with the naked eye as the laser beam passes through the liquid. The red light you see is not reflected light such as when sunlight is reflected by a particle in the atmosphere, causing the sky to be blue. Instead, a red colored light is produced and emitted from the surface of the AuNPs by the process of surface plasmon resonance, a unique property of nanoparticles. The light you are seeing is not reflected light, but "new" light energy, photons, which are being produced and emitted by spherical gold nanoparticles made up of 2,000 energized atoms of gold in such a s way as to coherently produce red-colored light. This effect indicates what those skilled in the art call a "sea" of freely moving electrons and protons on the surface of the AuNPs, having been supplied by water and the curcumin molecules, but shared amongst all chemical species within the aqueous suspension, including any polluted air that might pass through the aqueous suspension in this vessel 103. This production of and sharing of protons and electrons is what makes catalytic reactions possible that can transform deadly CO into harmless $CO_2$, producing breathable, nascent $O_2$ as described in this disclosure. A solution with dissolved ions has particles which are too small to reflect the laser light so you will not be able to see the laser inside a solution of, for example, table salt dissolved in water, but you can see the beam of laser light in a colloidal suspension of gold particles. The use of laser light is how one may test for the presence of AuNPs in this aspect of the innovations.

6) Allow the colloidal gold suspension to cool to room temperature before any further activities. An ice bath may be used but no benefit is observed by changing the cooling time or rate of cooling involved. The important fact is to allow the suspension to cool before any further procedure is attempted.

Otherwise, the AuNP can possibly agglomerate due to excess reactivity, producing the characteristic blue or black color, which is the indicator for the failed production of colloidal gold.

7) Add the preferred amount of ¼ teaspoon of washing soda powder, sodium carbonate ($Na_2CO_3$) to the solution. The range extends from zero to as much as you care to add since making the alkaline suspension more alkaline does no harm, whereas adding an acid or salt can have a very detrimental effect on the process 1000. Adding more alkalizing material to the suspension is a preventative measure which helps prevent future clumping or agglomeration of the AuNPs and ensures the continued catalytic power of the reagent. The addition of a strong acid, especially HCl, or a salt such as table salt (NaCl) can essentially reverse the process of making a AuNP, which requires an alkaline environment with few chloride ions which could re-solubilize some gold particles into gold chloride ($AuCl_3$), causing agglomeration of the colloidal gold suspension that forms fluid **103*l***.

In an optional additional step in the process 1000, a compound or chemical that serves as a visible pH indicator may be added to the solution. Alternatively, the pH may be measured continuously by an electrochemical sensor.

Curcumin is a plant-based colorimetric pH indicator that exhibits the same ruby red color as colloidal gold when the pH is between 8.0 and 12.0, the preferred range of pH for the reagent. Not only is curcumin the only plant-based pH indicator active within this pH range, but can also function as a source of electrons, a reducing agent that is beneficial to the stability of the AuNPs, in addition to the stock reducing solution used in first producing the gold colloid. This additional amount of reducing power further enhances and adds to the stability of the AuNPs.

8) Add one milliliter of stock curcumin solution to the room temperature, colloidal gold suspension. Stir with glass rod. The stock curcumin solution is made using a 30-milliliter dropper bottle. Add ¼ teaspoon of powdered turmeric extract, curcumin, of preferably 98% purity to the dropper bottle. Add ethanol of at least 100 proof (50% ethanol and 50% water) to capacity without overfilling. Cap and shake to dissolve the curcumin. Less than 100 proof ethanol will not dissolve curcumin, so a higher proof is more preferred.

Fat-soluble, organic solvents are used to extract plant polyphenols, such as curcumin, and the organic solvent can then be evaporated to provide the extract as a dried powder. Once the powder is re-solubilized in a safe solvent for human consumption, such as ethanol, which is miscible in water, the curcumin extract can be added in the colloidal gold suspension. Curcumin is an alcoholic extract of the turmeric plant, *Curcuma longa*. Curcumin, a polyphenol, can exist within any range of concentrations, but a concentration of 98% is preferred for the reagent applications. Suitable curcumin is available from any number of chemical suppliers, with Belle Chemical, LLC, PO Box 21874, Billings, Mont. 59104 being a preferred supplier.

9) Heat the colloidal gold suspension that now contains curcumin in a microwave, on top of kitchen stove or laboratory hot plate to a temperature of approximately 180° F., which is more than boiling point of the azeotrope containing alcohol and water. This process drives off any ethanol, leaving a AuNPs suspension now containing a plant-based pH indicator, reducing agent, and stabilizing organic ligand. The suspension may be boiled, but there is no need as the purpose of heating was to remove any ethanol, which occurs at approximately 172 degrees Fahrenheit. The alkaline colloidal gold suspension is then ready for use in the vessel 103 of the apparatus 100 as fluid **103*l***. Not wishing to be bound by theory, it is possible that the polyphenol, like other organic compounds, may bond to the gold colloidal particle in some manner to form what is commonly called a ligand.

Liquid-Filled Vessel 104: Final Wash

The last vessel 104 may contain any slightly acid solution **104*l* to neutralize any of the colloidal gold suspension in fluid 103*l* from vessel 103 that is carried over with air entering via air directing pipe, channel, or conduit 4118. However, it is currently preferred to use a citric acid and vitamin C in acidified water because citric acid is a safe acid present in foods, while vitamin C is also an edible vitamin. The solution or fluid 104*l* in vessel 104** can be made by dissolving 1 teaspoon Citric acid per liter of water (but also a range of ½ to 2 teaspoon) and 2 level teaspoons vitamin C per liter of water, but possibly as little as 1 teaspoon water.

The purpose of the acidified aqueous solution or fluid 104*l* is to ensure that every possible kind of chemical compound is ultimately scrubbed from smoke, rendering polluted air safe and healthy to breathe, while also humidifying the released air so that humidity is added to ambient air, which then allows for evaporative cooling to occur.

Historically, people have used wet cloths over their mouth and nose during a fire. It provides some much-needed cooling and moisture, plus does filter out some large particles, but chemically does very little to affect the smoke in any way. Plain water has little chemical neutralizing ability, which is one of underlying tenet of the innovations: to use simple, safe chemical reactions to not only filter out the smoke, but to chemically neutralize all the harmful components of the smoke.

The majority of gaseous components in smoke are acids or become acids when dissolved in water. Some of these pollutants could be filtered by the wet cloth, but only a small mass when compared to the total mass of pollutants in the smoke in the surrounding area. Plain water can "hold" or dissolve only a small amount of these compounds, unless another compound, with considerable mass, is also dissolved in the water to react with the acids or acid-forming compounds in the smoke, the process step that occurs in the alkaline slurry of the innovation.

Hence, in summary after polluted air has been through an oil bath filter in vessel 101, an alkaline slurry in vessel 102 and an alkaline AuNP suspension in vessel 103, the final aqueous acidic wash of the innovation is used to neutralize the only kind of chemical compound that can possibly remain in the air stream are basic compounds, or base-forming compounds.

Possible sources of these basic compounds could be the incoming polluted air or aspirated alkaline droplets from the reaction vessels of the innovation. First, proper design of the innovative apparatus and the skilled art of balancing air flow should prevent this from occurring. However, if for any reason, cross contamination of the liquids does occur, the final acid wash will neutralize any alkaline slurry droplets of limestone or alkaline washing soda. None of the chemical compounds used in various aspects of the innovation have low enough vapor pressure to volatilize. Cross-contamination of liquids can only occur by improper air flow balancing in the apparatus and aspiration, which if it does occur, the alkalinity is neutralized by the acidified water.

An aqueous acid bath or fluid 104*l* containing weak organic acids can effectively remove any basic or basic-forming compound in polluted air or remediate any possible malfunction of the process 1000, before any air is released. Any number of acids, either organic or mineral, could be used in the final wash fluid 104*l* of the process 1000, but again, one underlying tenet of the innovations is to use the safest, most easily available component for purifying air that is safe and healthy to breathe. One such organic acid is citric acid which is already a preferred acid in the apparatus 100 and could be used in the final wash. Alternative organic acids include malic and tartaric acids, and the like as well as mixtures thereof. However, the preferred organic acid is Vitamin C, ascorbic acid ($C_6H_8O$).

The preferred amount of Vitamin C to use is 2 level teaspoons per one liter of plain water, preferably distilled, but the use of distilled water is not necessary in the final wash liquid. Clean water is absolutely necessary as the water may be aspired and volatilized into the air released by the process 1000. The range can be 1 to 3 level teaspoons Vitamin C per liter of water.

The air released by the innovative apparatus 100 in the process 1000 is scrubbed clean of any and all particulate and chemical pollutants from combustion and/or pyrolysis of carbonaceous materials and enriched with nascent $O_2$ and beneficiated with Vitamin C.

Physical Designs

The various embodiment of the apparatus 100 may deploy one or more electric fans 10, that is 110/220 AC for residential and industrial uses, or 12-volt DC powered when intended for portable, personal use during a wildfire, either worn on person's person, in an automobile or in an enclosed room. Other features and aspects may include power plug, on/off switch with liquid tip-over sensor/switch, low water sensor/switch and pH sensor/switch in conjunction with other common electrical components necessary to the operation of an electrical fan should be obvious to those skilled in the art.

The fan 10 and preferably two fans 10 may be a starting point for any physical design and operation of the apparatus 100 with all other design parameters based on providing adequate bubbling action and mixing within each reaction vessel 102, 103 and 104, while providing for no aspiration of liquids to the next reaction vessel resulting in cross-contamination of liquids. Air resistance within the air piping system, plus the height of each liquid results in a certain head pressure the fan or fans 10 must overcome, called static pressure, commonly measured in inches of water.

The apparatus 100 is not limited in size and air purification capacity to the specific examples described in this disclosure and may be scaled to larger sizes by generally maintaining similar ratios of size and proportions. A fan 10 is the starting point of design based on the volume of air to be scrubbed within a set period of time. The fan 10 capacity is determined by CFM, cubic feet per minute, which must be moved by the fan(s) 10 through the apparatus 100. The apparatus 100 may be scaled to smaller and larger units, such as personal units, to purify the air in car and different size vehicles, or in home and facilities, depending on the potential expects exposure to air contaminants. A larger apparatus may use a fan 10 in each conduit connecting adjacent vessels.

The preferred embodiment may use at least a fan 10 capable of transferring 20 CFM of air into the apparatus 100 would treat 1200 CF per hour. This volume and time period comes from the EPA Wildfire Challenge Competition, a contest to remove smoke components during a wildfire event, from a room measuring 10 feet by 15 feet by 8 feet in ceiling height, totaling 1,200 cubic feet, within a one-hour period.

The smallest fan to be able to accomplish this task is the preferred size for a test apparatus 100. One such 12-volt DC fan blower, preferred for the apparatus 100, is Manufactured by Delta Electronics, 701 Brooks Avenue South, Thief River Falls, Minn. 56701 USA, model #BFB1012EF-0018H. This fan uses 3 amp or less and produces at least 20 CFM. This allows for a maximum wattage of 36 watt necessary to operate the apparatus 100. This amount of DC power is well within the capabilities of being supplied by battery power. A typical, 100 Amp-hour, automotive battery may power the apparatus 100 for up to about period of 33 hours.

The air piping system, that is conduits 2118, 3118 and 4118 and the vessels 101-104 have the preferred ratio and proportions equal to 1:4. That is the inner diameter of the air directing pipes, tubes, channels that form the conduits 2118,

3118 and 4118 is about 25% compared to the inner diameter of the reaction vessels 102, 103 and 104 respectively. This ratio contributes to the wide lateral spread of bubbles in the fluid along the bottom of the reaction vessel to increase residence time of the partially purified air with the fluid in the vessel. The possible range of this size ratio may vary with the size and shape of the vessel 101-104 and hence may more generally vary from a ratio about 1:2 to about a 1:10 ratio.

The height of the reaction vessels 101-104 may also be determined based on the above ratio. With an inner diameter of one inch for the conduits 1118, 2118, 3118 and 4118 in their respective vessels the preferred height of the reaction vessel may be about 10 inches, that is for a ratio of 1:10. However, depending on desired reaction times and means used to prevent spills and aspiration of the fluid between vessels, the ratio may vary from about 1:4 to 1:100.

The height of each vessel 101, 102, 103 and 104 may also be expanded in proportion to the intended volume of the fluid 121, 102*l*, 103*l* and 104*l* such that if the vessel or vessels are accidentally disposed horizontally the liquid or fluid may be precluded from entering the next vessel if check valves 150 or a comparable fluid blocking means are not deployed.

The water reservoir 105 may be used to replenish water, called make-up water, which is lost from the apparatus 100 due to the evaporation of water and its subsequent released into the ambient air for the purpose of humidifying the air, thus providing for evaporative cooling in the process 1000. The oil bath filter of vessel 101 does not need a reservoir as the oil is not volatilized due to high vapor pressure. The colloidal gold suspension fluid 103*l* may not need to be replenished by the reservoir as water evaporates, in that aspirated liquid from the alkaline slurry 102*l* may replenish any water lost from the colloidal gold suspension 103*l* in vessel 103. This way, any water vapor that does move over to the next vessel will essentially be evaporated water with no dissolved solids, the same as distilled water, yet any water droplets which do happen to pass over to the vessel 103 from vessel 102 may carry alkaline substances which help to maintain the alkaline nature of the gold suspension in fluid 103*l*.

The water reservoir 105 is preferably above the reaction vessels 101-104 so that gravity can be used to fill the vessels 102-104, instead of using an electric pump 105*p*, as would be the case in larger units, especially residential or industrial units using larger fans 10 and larger reaction vessels 101-104 with more complex electrical control devices.

The preferred method is to add purified, and preferably distilled, make-up water anytime the liquid level of the colloidal gold suspension fluid 103*l* in the reaction vessel 103 and the acidified aqueous solution 104*l* in vessel 104, becomes equal to or less than about half of the original height of the liquid when the fan 10 is turned off. The simplest electrical circuit design for those skilled in the art would be a timer, which alerts the user to check the water levels. With the fan 10 turned off, it is a simple matter of opening a valve to allow water to enter the vessels 103 and 4 and then closing the valve when the required level is attained. This is the simplest embodiment of the apparatus 100.

For those skilled in electrical circuits and for large units such in residences and industry, more complex electric circuits will be beneficial. In this case, metal electrodes of inert metal, such as stainless steel can be used to conduct electric current when submerged in the alkaline or acidic, electrolytic environment in these reaction vessels. When the liquid level falls below the level of the electrodes, a switching circuits is energized, which can in turn off the fan and turn on a pump to fill the reservoir 105 back to the required level. If the apparatus 100 runs dry for some reason, with all water evaporated, the process 1000 is rendered ineffective, but as soon as water is again supplied within the reaction vessels 102-104, the apparatus 100 will operate again, with no damage to the apparatus 100.

The threshold to stop filling with water (upper control limit) is the height of the original height of the liquid in the reaction vessel, as determined by the ratios and proportions given for size of the fan, inner diameter of air piping and inner diameter of the reaction vessel and the height of the vessel as determined by the inner diameter of the air piping.

As long as the apparatus 100 operates under conditions in which the pH of the colloidal gold suspension fluid 103*l* in the reaction vessel 103 remains alkaline with a pH of at least 8.0, the catalyzing reaction is likely to occur. If the fluid 103*l* becomes more acidic than 8.0, the gold particles will agglomerate into larger particles, rendering them no longer catalytically reactive. This renders the apparatus 100 incapable of oxidizing CO into $CO_2$ and producing nascent $O_2$. However, the oil bath filtering provided by vessel 101, alkaline fluid 102*l* and acidified solution 104*l* will continue to remove any and all other air pollutants.

Accordingly, the apparatus 100 may contain at least one additional reservoir like 105 with an acidic or basic solution for correcting the pH, in response to the signal from a pH sensor in the respective vessel. The apparatus 100 may have a single reservoir with only water, an acidic solution, or a basic solution. Alternatively, the apparatus 100 may have two reservoirs for any two of only water, an acidic solution, and a basic solution. Alternatively, the apparatus 100 may have a single reservoir for each of only water, a basic solution, and an acidic solution for a total of three reservoirs. The reservoirs may each utilize separate valves and or pumps, along with pipes to the appropriate vessels as described with respect to the water reservoir 105.

Alternatively, the pH in any vessel may be corrected by removing and testing the fluid thereof or using a colorimetric pH indicator in the fluid. Curcumin is a non-limiting example of pH indicator due to the fact that it operates within the preferred pH range of the apparatus 100, 8.0 to 12.0. Other indicators could be used, but they are all products of industrial chemical synthesis, typically being manufactured from coal tar derivatives and pulp paper mill waste products, which means they are less desirable in a device for producing safe and healthy air to breathe. Curcumin will turn to a yellow color as the pH drops below 8.0.

An electric device for measuring pH can also be used instead of the chemical indicator. To those skilled in the electrical circuit arts, one method to make a pH sensor for a meter or switching circuit would be two metal electrodes or probes, of an inert metal such as stainless steel, which would be placed below the point of lowest water level in the reaction vessel.

The alkaline colloidal suspension in fluid 103*l* is an electrolytic environment that will allow for the passage of electric current between the two electrodes/probes in such a way as to be used in an electrical circuit to turn off the operation of the apparatus 100 when the pH of said vessels falls below 8.0 pH. When this happens, the user of the apparatus 100 has the option of either disposing of the unit or getting the apparatus 100 refurbished, with the appropriate vessels being refilled with a new alkaline slurry 102*l*, colloidal gold suspension 103*l* and acidified solution 104*l*. Another option is to allow the apparatus 100 to continue to be operated in an emergency, scrubbing all harmful air pollutants from the polluted air except for CO.

Experimental Results

Figure 3:
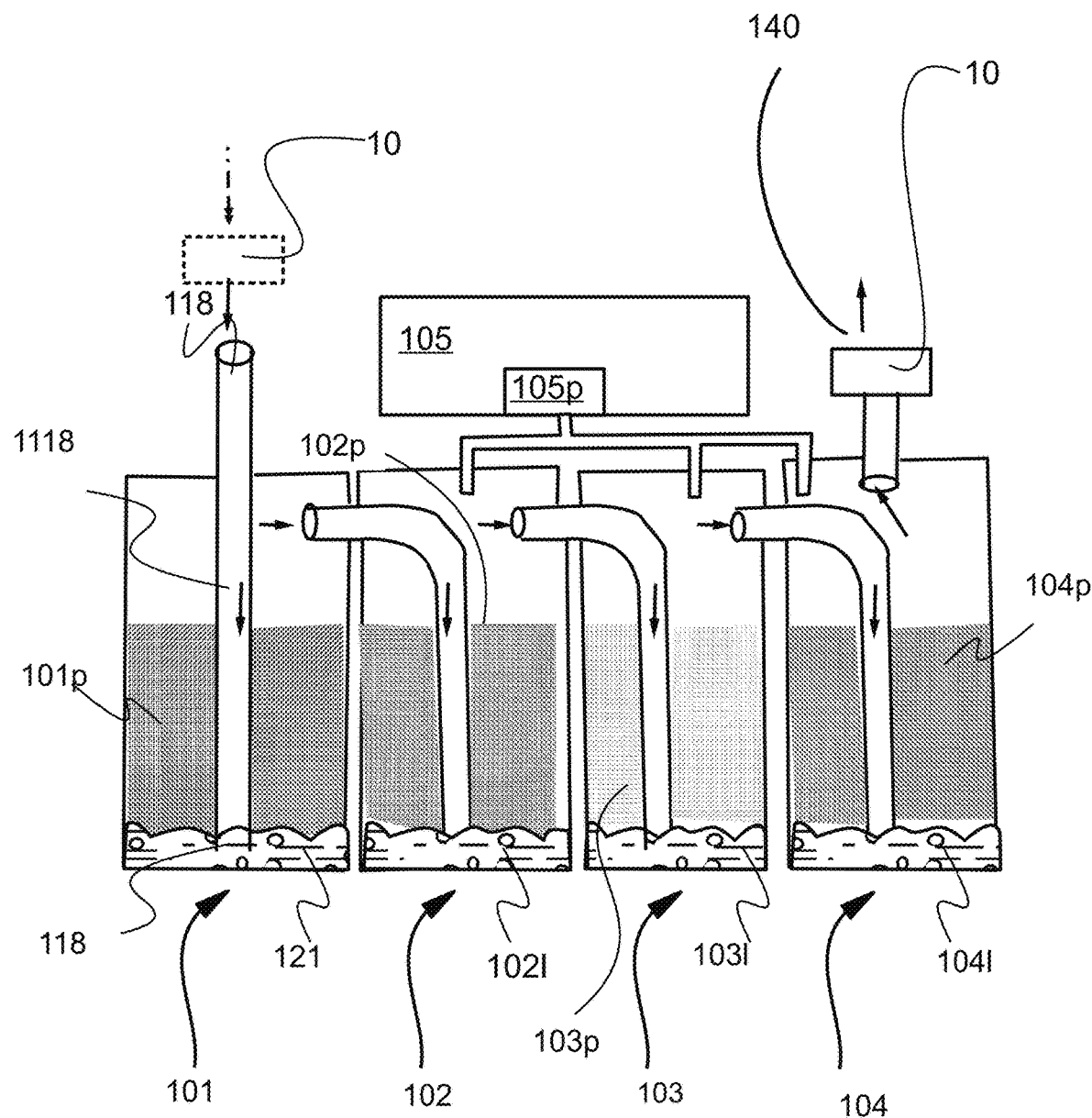
FIG. 3 is a schematic system diagram of an alternative embodiment of the components deployed in the process of FIG. 1.
Figure 4:
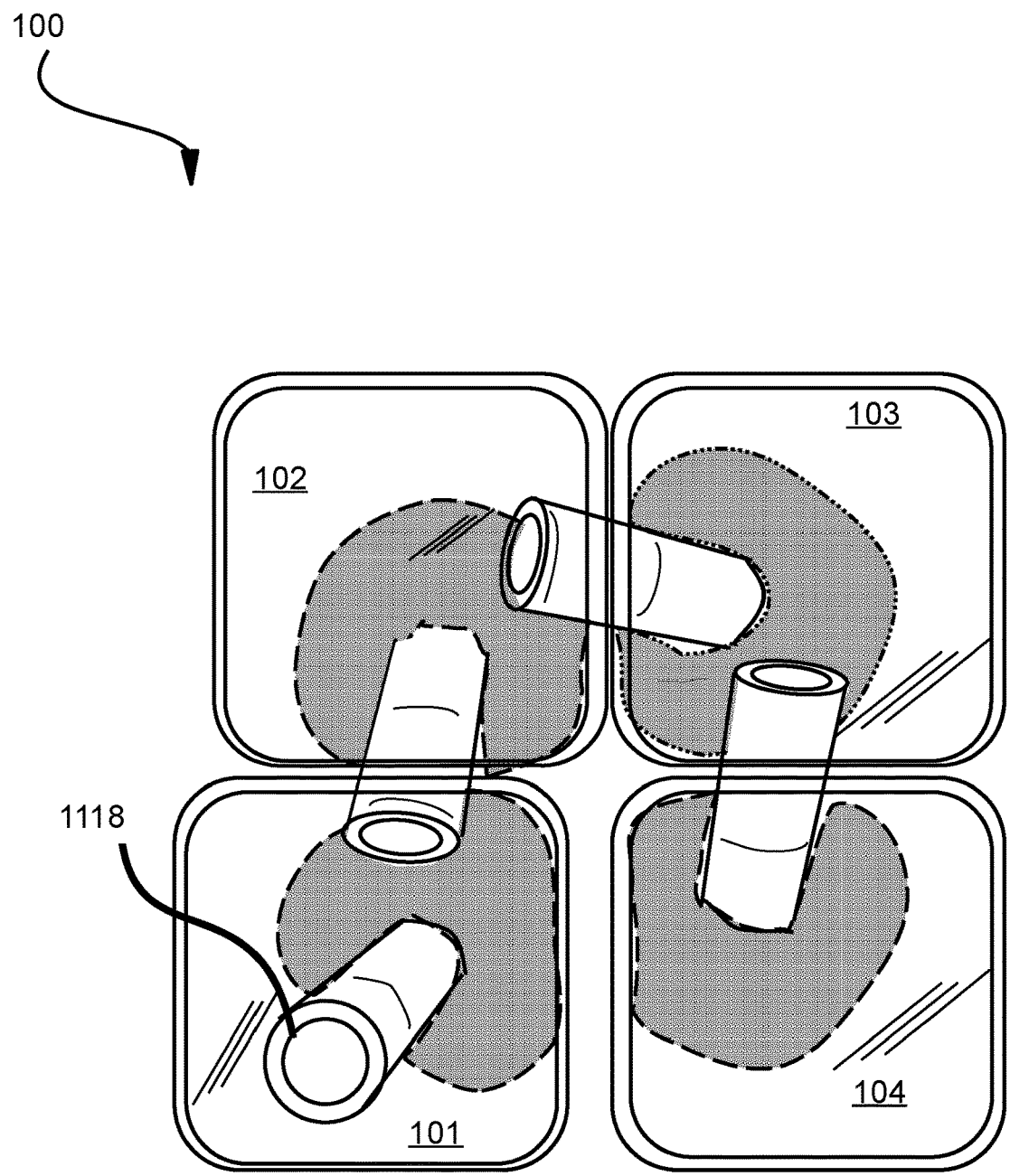
FIG. 4 is a photograph from above a test apparatus that contains the vessels connected per the schematic system diagram of FIG. 3.
Figure 5:
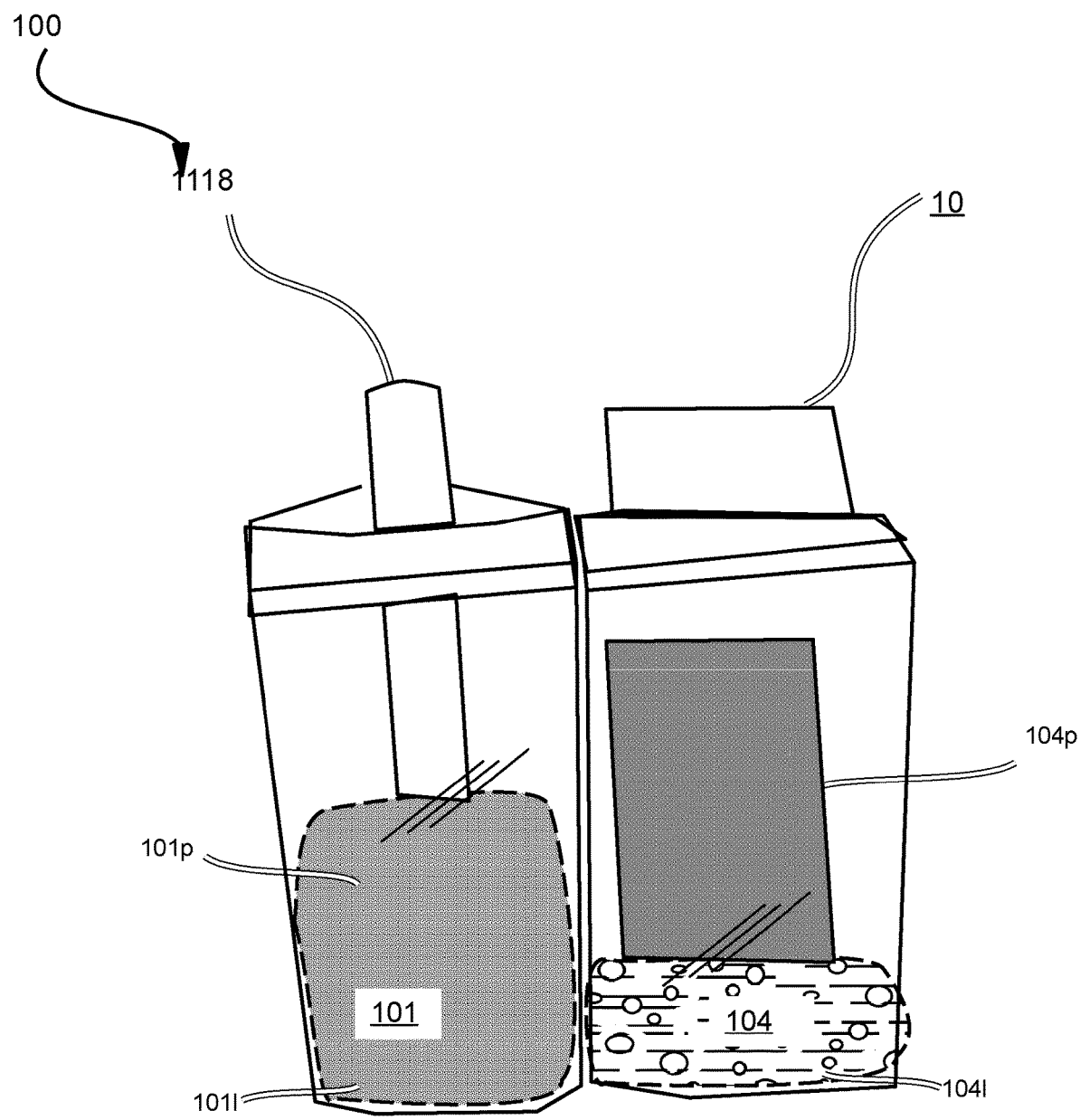
FIG. 5 is a photograph of a side of the test apparatus of FIG. 4.

The test apparatus illustrated in FIGS. 3, 4 and 5 was used to mitigate smoke generated from burning charcoal on a grill within an enclosure that was approximately 4 feet by 8 feet in floor area and 8 feet high for a total volume of about 256 cubic feet (CF). It should be noted the fan 10 is located after vessel 104, and it thus drawing air into the first vessel 101 via an entrance portal 118.

Appendix 1 compares the results of 4 experimental tests.

In general, the following reductions in particulates and gases occurred over 2 hours: 90% reduction in PM 2.5; 90% reduction in PM 10.0; 97% reduction in Formaldehyde (HMO) and VOCs, 65% reduction in $CO_2$ and up to 5% additional $O_2$. depending on Ozone concentration. Significant reductions in PM 2.5 occurred generally with 45 minutes to an hour.

Other aspects of the apparatus 100 construction can be used to improve the embodiments already described, as well as used in any combination together to provide additional alternative embodiments.

Figure 6:
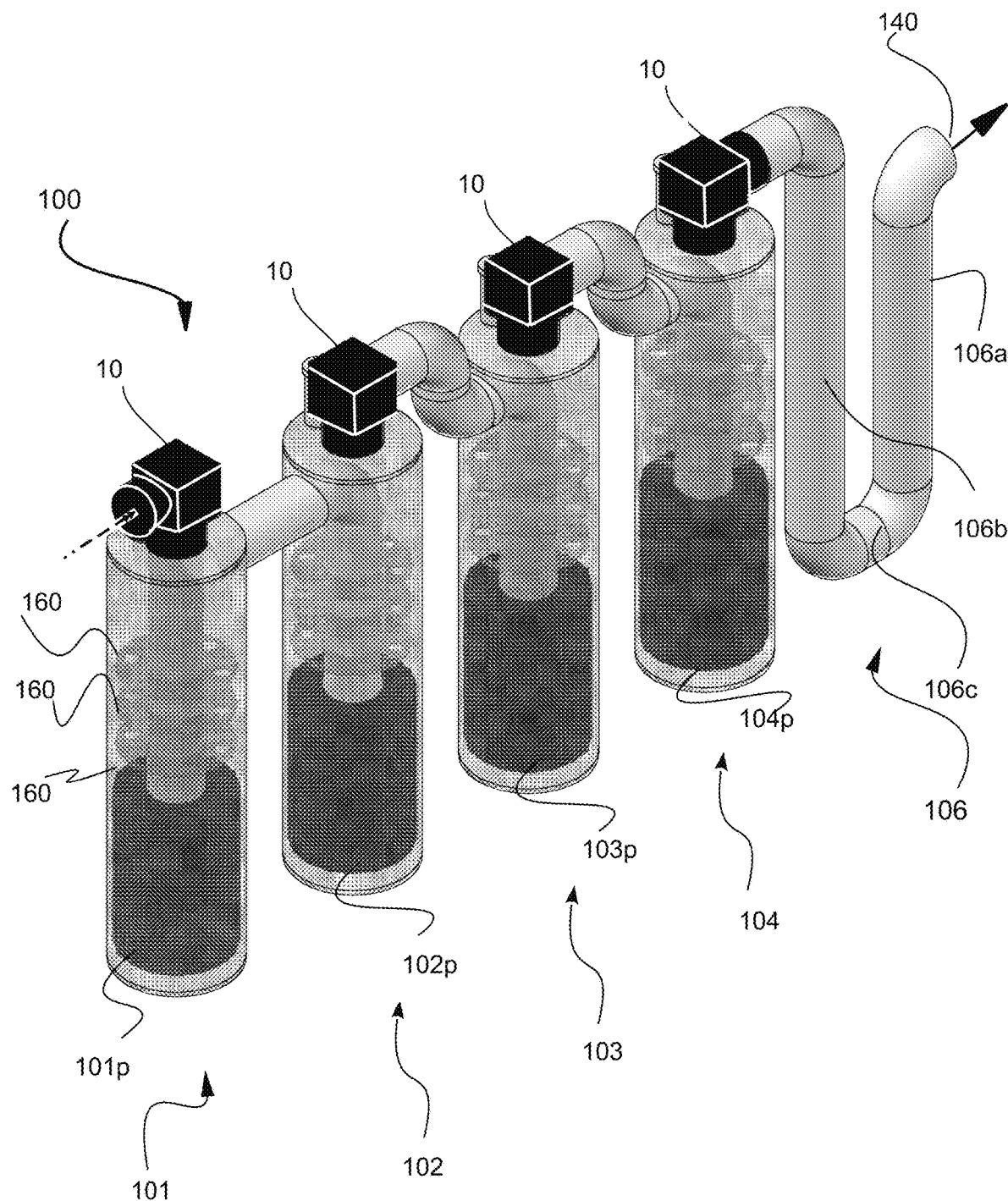
FIG. 6 perspective view of different embodiment of an apparatus that may be deployed in the process of FIG. 1.
Figure 7A:
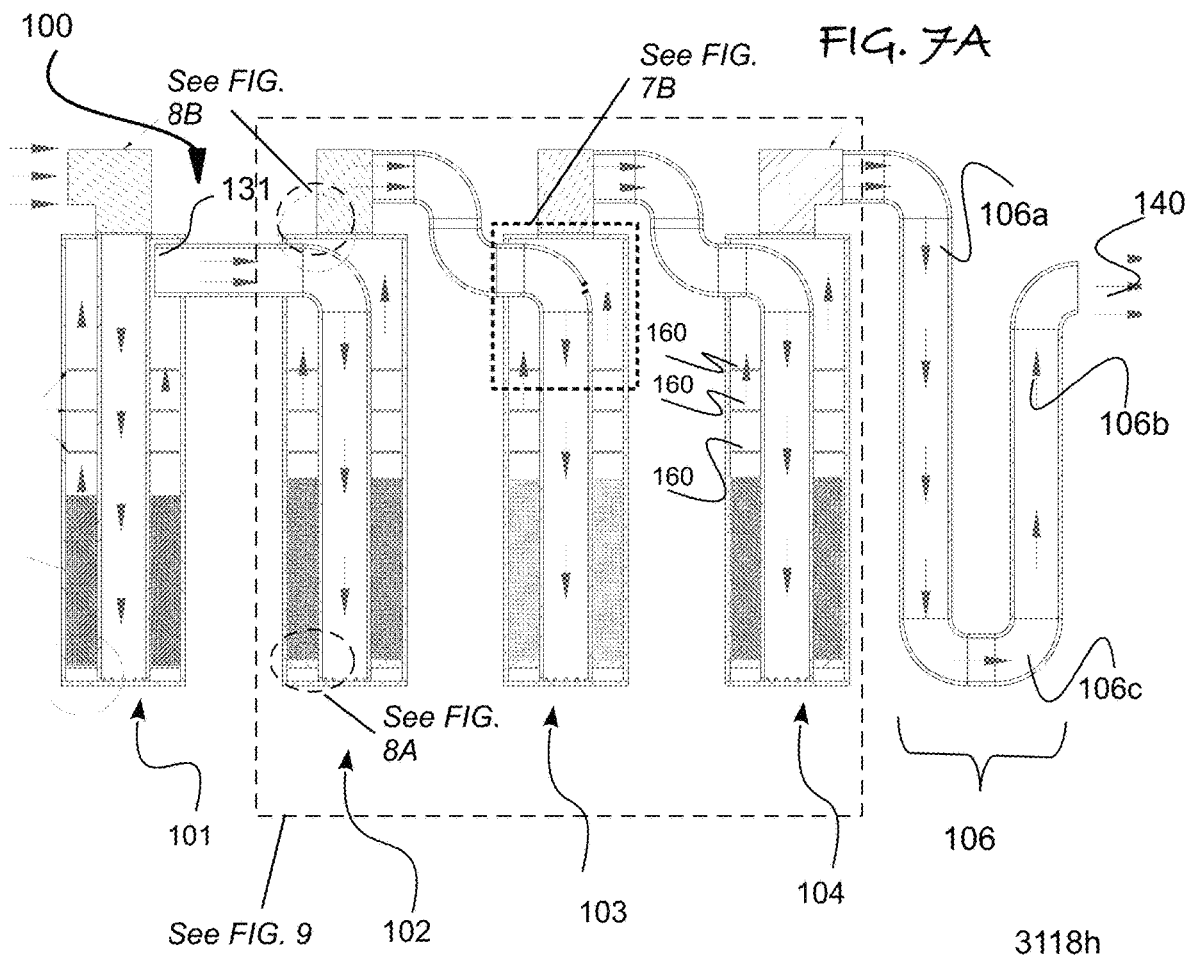
Figure 7B:
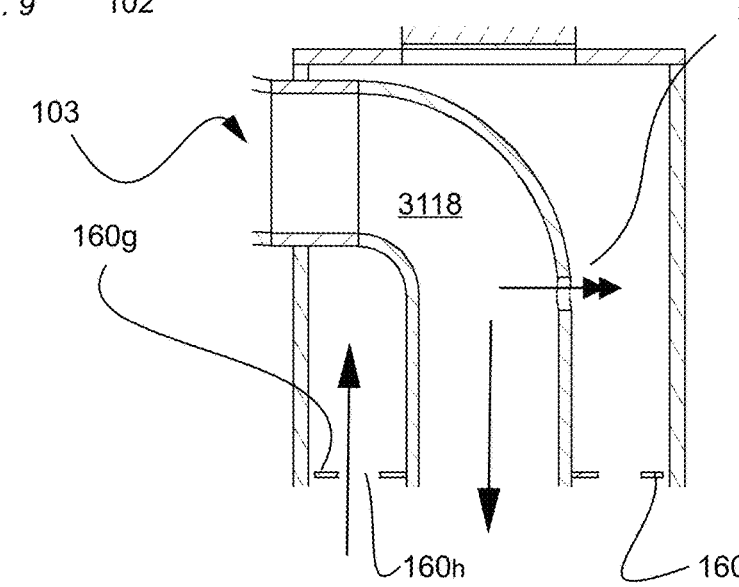
FIG. 7B is a side cross-section elevation view of the indicated portion thereof in FIG. 7A.
Figure 8A:
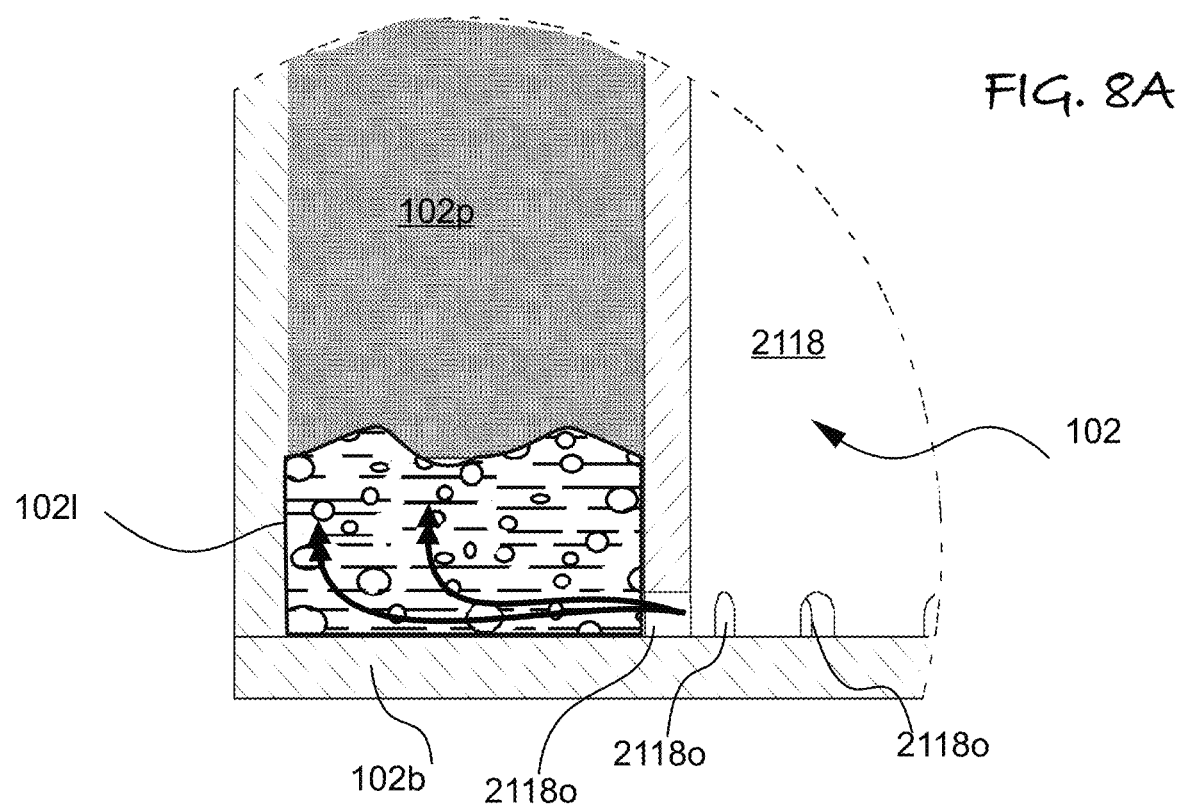
FIG. 8A is an expanded view of the indicated portion of a vessel in FIG. 7
Figure 8B:
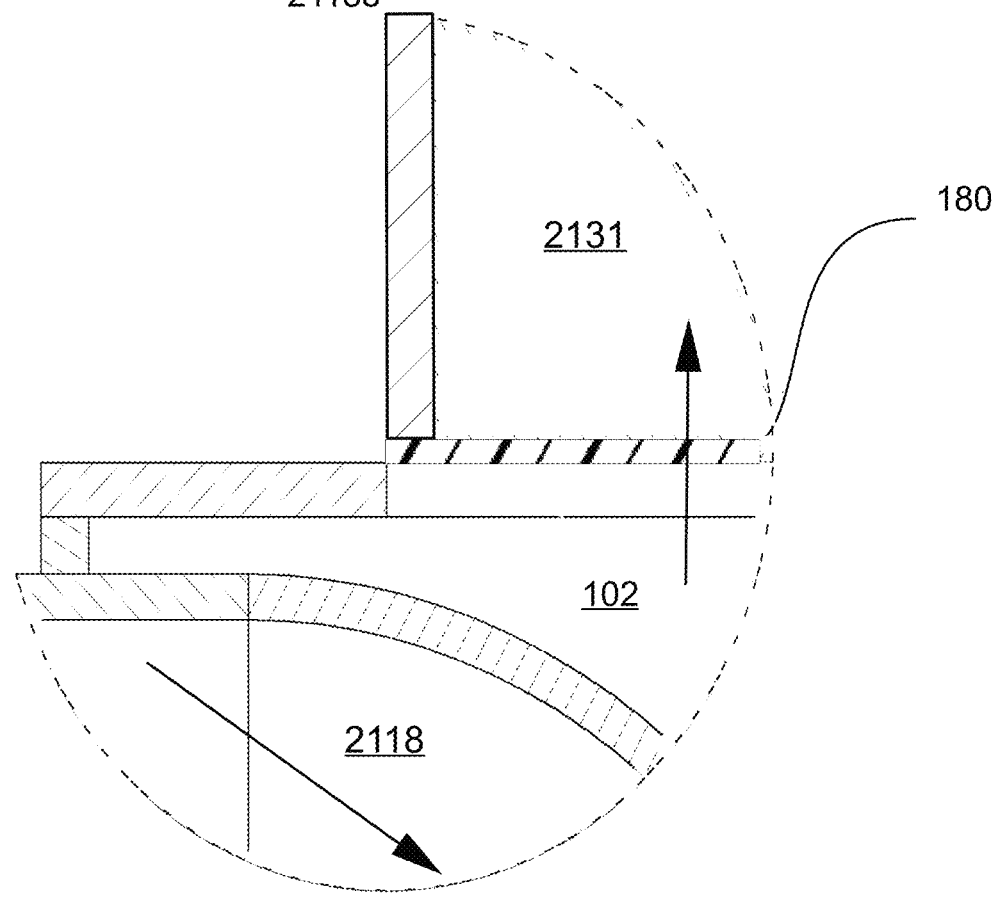
FIG. 8B is an expanded view of a different portion of the embodiment in FIG. 7.

For example, the embodiment of FIGS. 6, 7 and 8A shows how the bottom of the conduits 2118 (as well as conduits 3118 and 4118) may extend to the bottom 102b of the vessel 102 but has a series of lateral facing orifices 2118o of about a ⅛-inch diameter about the perimeter of the conduit 2118 to form the entrance port 218. The opening diameter of the orifices 2118o can be lower to further reduce bubble size, or larger. The bubble size can potentially be reduced further by placing a porous media in the fluid 102l, such as in front of or above the orifices 2118O. When the porous media or packing 102p has openings smaller than the diameter of the orifices 2118o, the exiting bubbles may be more finely dispersed into smaller bubbles. The divisions of the exit port of each conduit with orifices enables a steady state continuous flow of bubbles of sufficient size to provide the residence time in the respective fluid so the entering air is continuously purified Hence, it is also preferable that each of conduits 2118, 3118 and 4118 are configured as illustrated in FIG. 8A, extending downward to the bottom of the vessel 102, 103 and/or 104, but having an entrance port 218, 318 and 418 equivalent to orifices 2118o just above the vessel bottom 102b. However, any of the conduits 2118, 3118, 4118 can also be sealed at the horizontal bottom so the orifices are at the perimeter just above the sealed bottom. The bottom can also be perforated to have very small holes or orifices. The double headed arrows in FIG. 8A illustrate that the partially purified air exiting the conduit 2118 at orifices 2118o will be injected as bubbles that migrate first in a lateral path toward the out perimeter of the fluid 102l before starting to rise in the fluid 102l. The ratio of the conduit diameter to vessel diameter may be varied based on the efficiency of lateral spreading of air bubbles as they first enter the fluid therein. Hence, concentric arrangement of the conduit 2118, 3118 and 4118 within a circular vessel at the aforementioned 4:1 ratio is preferred to improve the efficient use of all the other available fluids therein.

A gasket 180 may be positioned on top of each between vessel 101, 102, 103 and 104 and disposed between the exit port 2131, 3131 and 4131 and conduits 2118, 3118 and 4118 or fans 10. Otherwise, such conduits connecting the top of each vessel 101-104 to the next vessel may constitute a singular air manifold that could transmit vibrations from the one or more fans 10 among the vessels 101-104. Hence, the intervening gasket 180 surrounding and disposed on the exit port 2131, 3131 and 4131 at the top of the vessel 102-104 allows the top of the gasket 180 to connect to either a fan 10 or any of the conduits 2118, 3118 and 4118 that direct partially purified air to the fluid in the next vessel. The gasket 180 thus not only forms a fluid and airtight seal but is also preferably a sufficiently elastomeric member to reduce. dampen or eliminate such vibrations, as illustrated in the expanded view of the portion of vessel 102 in FIG. 8B. The embodiments of FIGS. 6, 8, 10A and 10B illustrate a separate fan 10 on each of vessels 101-104, disposed on the top of each vessel to supply air to the central tube in a circular vessel that provides the conduit to direct air to be purified to the fluid in each vessel 101-104.

FIGS. 7, 10A-B and 13 also illustrate another preferred embodiment of disposing generally concentric disks 160 that acts like dikes between the terminations of the conduits at exit ports 118, 218, 318 and 418 but also situated above the respective packing materials 101p, 102p, 103p and 104p and below the top of exit ports 131, 2131, 3131 and 4131 of each vessel. The concentric discs 160 are preferably connected to the external wall of each conduit, such as external wall 2118e of the conduit 2118 (for vessel 102) as illustrated in 7B and FIG. 14. There is generally a small gap 160g between each vessels interior wall and the disks 160 to allow air to exit the fluid and packing and flow upward to exit the vessel. The concentric discs 160 are also perforated laterally by a plurality of holes 160h to allow air to pass. Each of the one or more concentric discs 160 are believed to retard evaporation of water with air but can also retard liquid surfaces if the vessels are tipped over.

Figure 9:
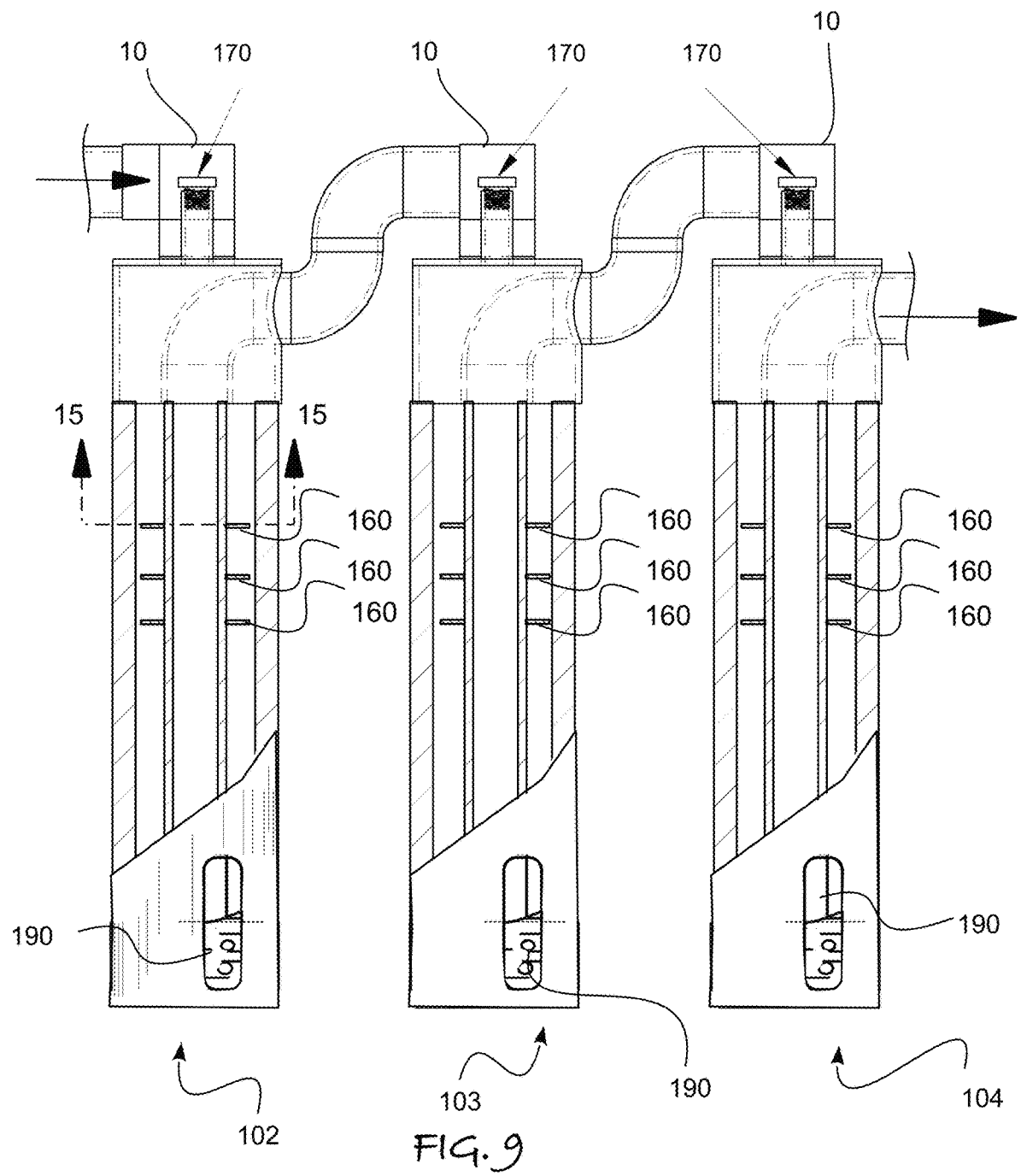
FIG. 9 is a partial cut-away view of vessels in the embodiment of FIG. 7.
Figure 13:
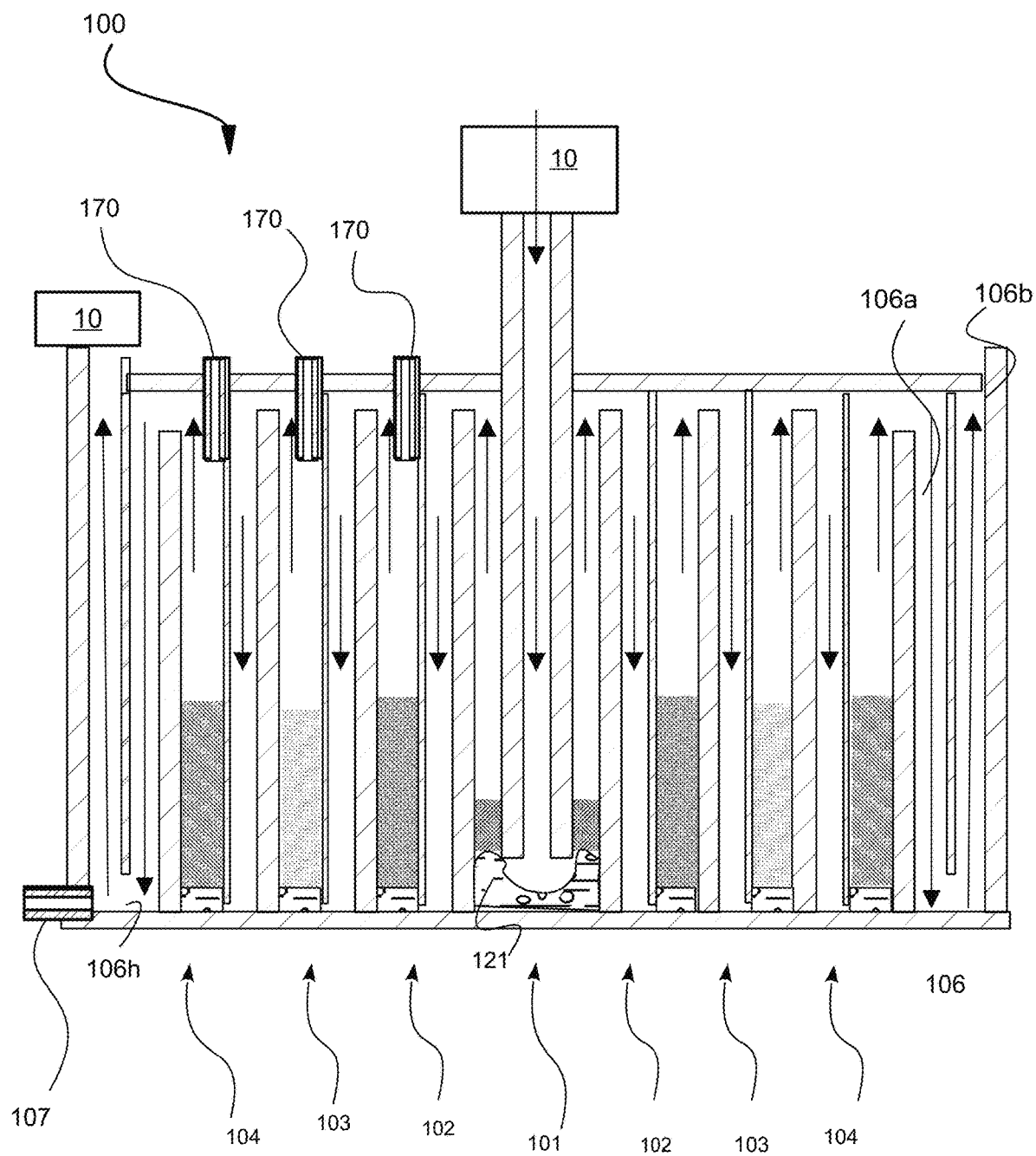
FIG. 13 is a cross-sectional elevation view of another alternative embodiment.
Figure 14:
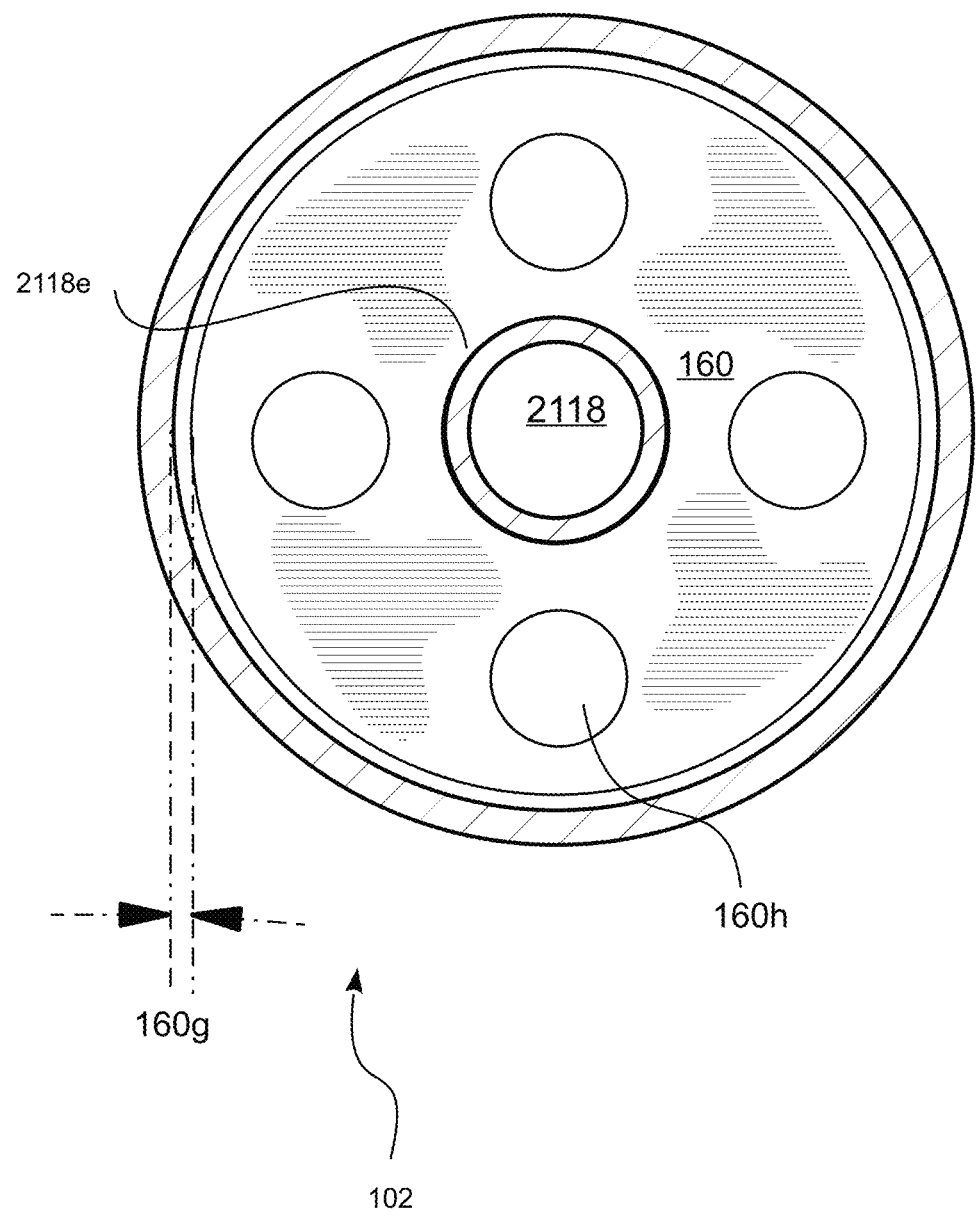
FIG. 14 corresponds to the section marker in labeled 15-15 in FIG. 9.

FIG. 9 also illustrates an external portion of the vessels 102-104 having a window 190 at the bottom to allow an external viewer to determine the volume of fluid in the vessel. When the level of fluid is below a horizontal reference line on or adjacent the glass, make up fluid or water to account for evaporation can be added via the taps 170 at the top of each vessel, which are normally closed by screw in caps as shown in FIG. 9 and FIG. 13.

To obtain the target purification rates in the preferred configuration, each of the one or more fans 10 deployed before vessel 101 and after vessel 104 may need to be capable of producing a flow rate of 14.4 cubic feet per minute (CFM), taking into account the resistance of the packing materials, fluids, turns and the length of the tubes and ducts connecting the vessel 101, 102, 103 and 104. It has been discovered that providing a single hole 3118h in upper portion of the exit port 3118 proximal to the top of vessel 103, as illustrated in FIG. 7B, may help to achieve a balanced flow of air between vessels. The flow of some of the air exiting the vessel 102 into the head space above the fluid in vessel 103 is indicated by the vertical double headed arrow through hole 3118h.

Figures 11A, 11B:
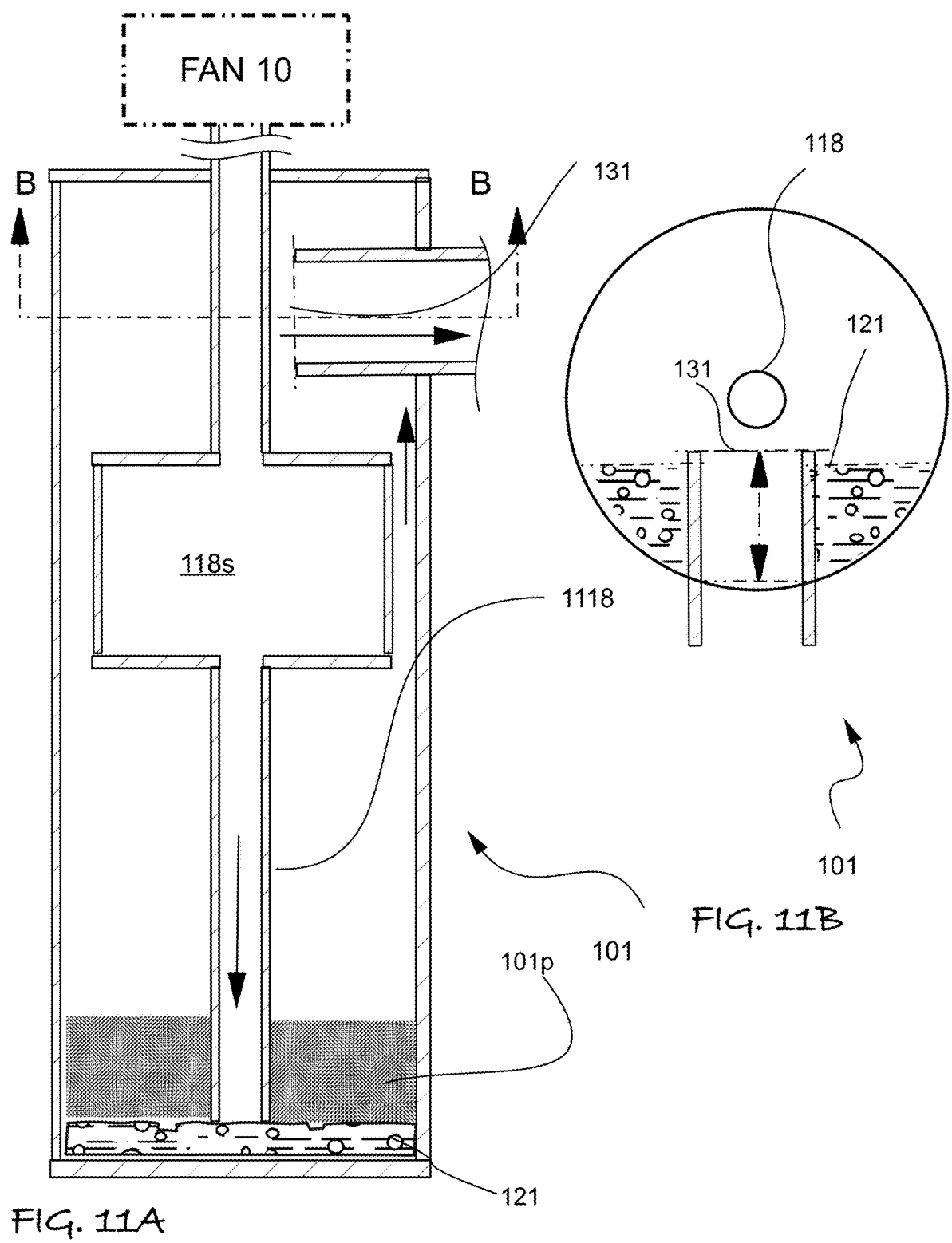

FIG. 11 schematically illustrates an alternative embodiment of the vessel 101 in which the fluid is an oil or mixture of oils 121 to retain soot and other particulate may deploy a spill containment region 1118s in conduit 1118. The spill containment region 1118s may be formed by expending the diameter of a middle portion of the conduit 1118 from the fan 10 directing air into the first vessel 101. The spill containment region 1118s would retain the oil or mixture of oils 121 if the vessel 101 and/or apparatus 100 is overfilled and tips to a vertical position, preventing the oil 121 from reaching an intake fan 10 via the conduit 118. FIG. 11B illustrates that when the vessel 101 is horizontal the exit port 131 is still above the level of the oil or oil fluid mixture 121. The narrow gap between the exterior of the spill containment region 118s and the interior sidewall of the vessel 101 slows the flow of oil 121 if tipping occurs, such that surges of oil or oil mixtures 121 as waves would be limited to prevent spillage into the exit portal 131.

In several embodiment, such as those of FIGS. 6-7 and 12-13 the purified air exiting the last vessel 104 may enter U-shaped pipe or tube 106 to be directed downward in a first portion 106a and then upward in a second portion 106b. The bottom 106c between portion 106a and 106b may serve to collect potential carry over of sprays that condense or coalesces within the U-shaped pipe 106. The exit exhaust fan 10 may be situated at the end of the U-shaped pipe 106. The bottom portion 106c can be configured to drain any collect liquid residue with a radial channel (not shown).

Figure 12:
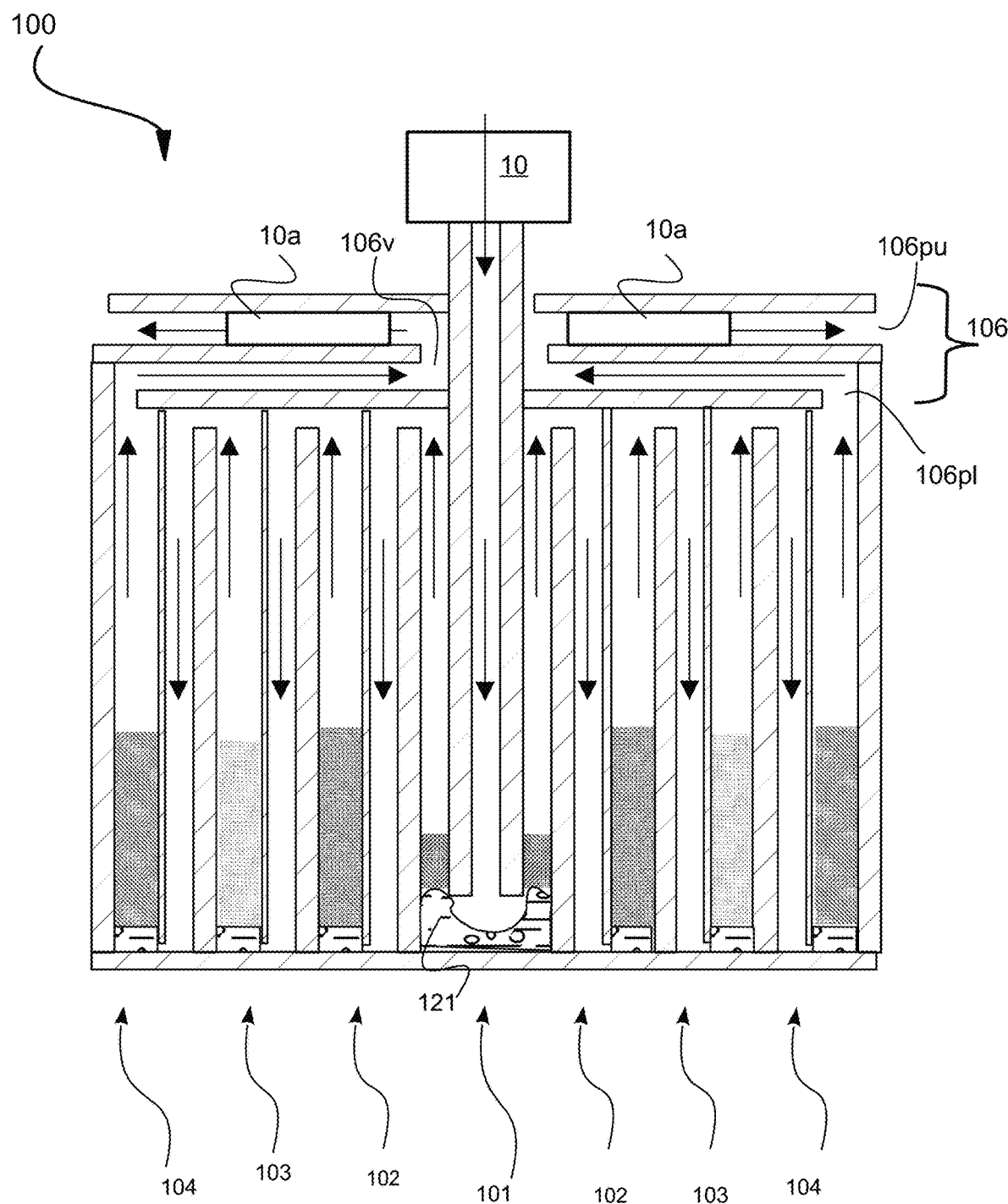
FIG. 12 is a cross-sectional elevation view of another alternative embodiment.

FIG. 12 illustrates in a cross-sectional elevational view a an optionally circular apparatus 100 in which each of vessels 102-104 are arranged concentrically around the prior vessel it receives partially purified air from, starting with the configuration of the first vessel 101 as in any other embodiments, but illustrated following FIGS. 10A and 10B. Thus, vessel 101 has an annular exit port 131 and is surround by an annular shaped conduit 2118 for air to flow into the fluid 102l in vessel 102. Vessel 102 which may be shaped as a cylindrical annulus centered about vessel 101 and in turn surrounded by an annular conduit 3118. Vessels 103 and 104 are similarly arranged as annular cylinders with an interior annular conduit for receiving partially purified air exiting at the top of the vessel they surround. This circular and concentric configuration of vessels 101, 103, 102 and optionally vessel 104 may be very efficient for forming compact as well as large devices. It may also provide for simpler assembly of the apparatus 100 from 2 or more molded components in which the bottom component has concentric walls that define the vessel 101, 102, 103 and 104. A top component could have a center tube to direct air from the fan 10 into vessel 101, with surrounding concentric walls that extend partially or totally into the other vessels to define the air passage from the top of the nearest inner vessel to the immediately adjacent surrounding vessel. The nesting of the top and bottom compartments with interlacing of the surrounding annular walls that can provide a gap at the top of each vessel for air to flow down into the next vessel. The bottom of the annular walls of the top components preferably have orifices at the perimeters to limit the air bubble size and extend to otherwise contact or seal to the bottom of the vessel they are inserted into, as in other embodiments.

In the embodiment of FIG. 12 the functional equivalent of the U-shaped pipe 106 is now a pair of stacked discs connected at the central region, in which purified air exits at the perimeter 106pu of the upper disc, and enters from the last concentric vessel 104 at the perimeter 106p of the lower disc. The exhaust fan 10 for the U-shaped pipe 106 may have a generally horizontal arrangement of blades that are arranged to extend redial with respect to geometric center of an annular support that rotates within the region indicated by reference no. 10a. The central vertical portion 106v connecting the upper and lower disk like portion can be configured drain any collect liquid residue with a radial channel (not shown).

Alternatively, as illustrated in FIG. 13, a similar apparatus 100 with a concentric series of upright annular cylindrical vessels 102, 103 and 104 may utilize the last series of connections with the annular cylinders that forms the vessels 104 to function as the U-shaped pipe 106. Hence, the concentric apparatus 100 in FIG. 13 deploys a U-shaped pipe 106 that consists of an inner and outer annular concentric cylindrical portion such that purified air exiting the inner annulus that forms the vessel 104 will first flow vertically down in first portion 106a and then vertically upward in the second portion 106b towards an exit fan 10.

A drain tap 107 may be provided at the outer perimeter of the apparatus 100 to be in fluid communication with the lower portion horizontal portion 106h of the last annular portion that provide a functional equivalent to the U-shaped pipe in other embodiments. This and other embodiments of the apparatus 100 may include the illustrated taps 170 for refilling or adding water to the fluid in vessels 102, 103 and 104. The apparatus of FIGS. 12 and 13 need not be strictly circular, as the explanation with respect to circular vessels 101-104 is to clarify the nested configuration vessels being disposed around the perimeter of the vessel they receive partially purified air from. Hence, the nested vessels 101-104 in FIG. 12-13, can be as well as in other embodiment can have rectangular, round, elliptical horizontal cross-sectional shapes, or any combination of closed geometric forms that have linear or curvilinear bases as the cross-sectional shape, along with upright walls. Further, vessels 101-104 need not have the same shape nor the same height.

Figure 17:
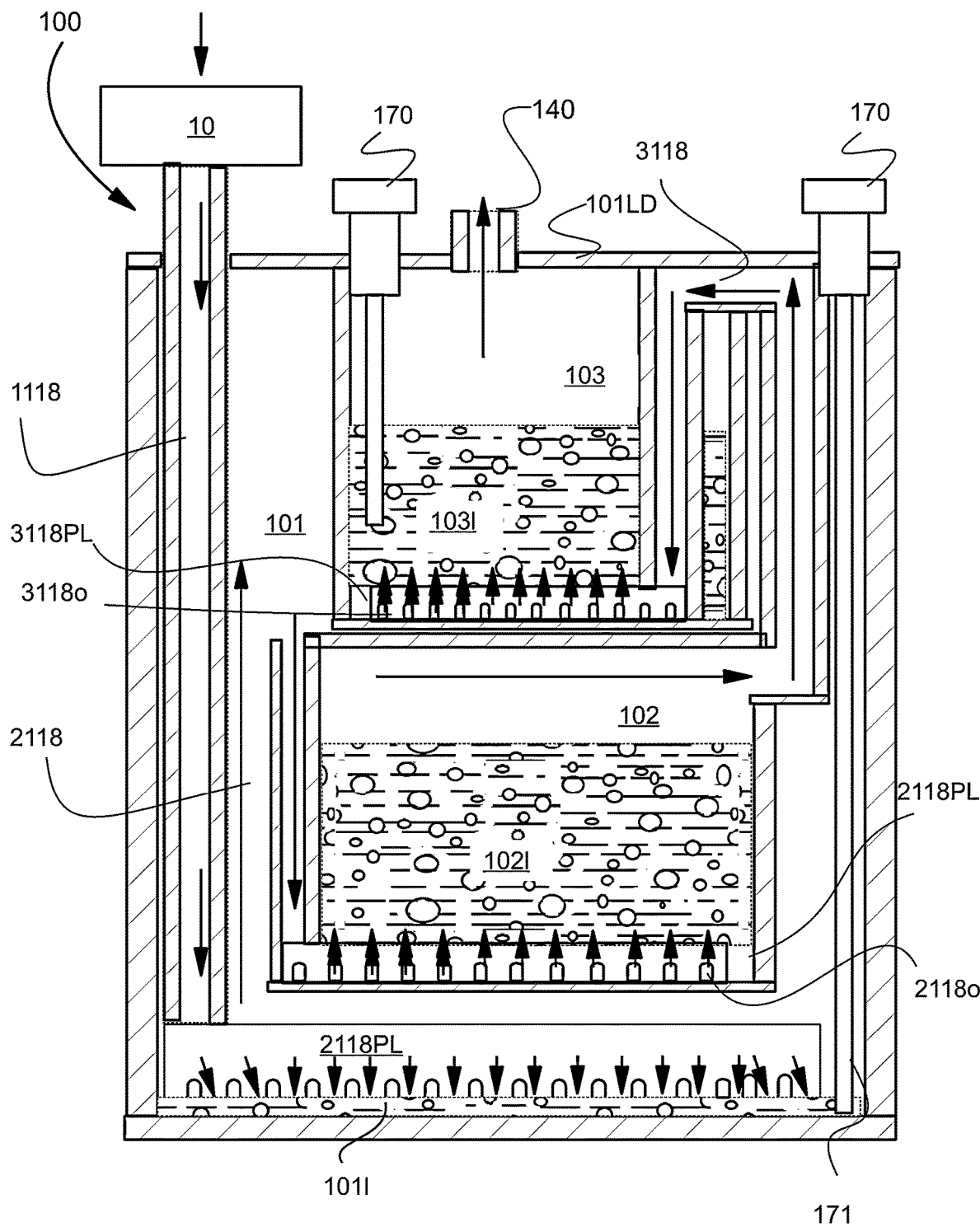
FIG. 17 is cross-sectional elevation view of another alternative embodiment.

FIG. 17 is a cross-sectional elevation view of another embodiment in which at least some of the vessels 102-103 may be stacking one above the other in a larger vessel 101 that contains the oil or oil mixture 121. The fan 100 blows air down conduit 1118 to the bottom of vessel 101 where a lateral a plenum 1118PL with a plurality of spaced apart orifice 1118O. Each spaced apart orifice 1118o provide an individual jets directed downward on top of the oil 121 that is disposed below the horizontal plenum 1118PL. The air that has lost the soot particles then fills the entire vessel 101 and exits at port 1131. The air then travels in a conduit 2118 to the horizontal plenum 2118PL with a plurality of spaced apart orifice 2118o below the fluid 102l. The orifices 2118o that collectively provide the entrance port 218 in vessel 102 may be disposed in opposing sides of a one or more plenums that are immersed in the fluid 102l, the conduit 2118 may be divided to be one more than an external side of the vessel 102, with the plenums 2118PL also be on the side of the vessel 102 but in fluid communication to receive partially purified air via the paced apart orifices 2118o on the one or more plenums 2118PL. The partially purified air exiting vessel 102 at the exit port 2131 may be directed by the conduit 3118 to a one or more horizontal plenum 3118PL that are in the fluid 103l or externally at one side or two opposing sides of the vessel 103.

The partially purified air then exits vessel 102 and enters vessel 103 via the conduit 3118, in which it is directed laterally in one of more horizontal plenums 3118L, which releases the air that is partially purified through orifice 3118o to bubble up through the nano gold suspension of fluid 103l and may exits as more purified air at exit port 140. Vessel 103 may be attached to the lid 101LD of vessel 101 and vessel 102 may be attached to vessel 103. One of more of vessels 101 and 102 may have sample taps 170 that optionally suspend a dip stick 171 in the respective fluids therein for checking the liquid level. Each of these two vessels will have dipsticks 171 The tap 170 of vessel 102 will double as a port for adding distilled water. Water can be added to vessel 103 through the exhaust port 140. Alternatively, exit port 140 can be cleansed of potential alkaline components in air stream by leading to vessel 104 configured as an adjacent vessel as in other embodiments, or stacked within vessel 101 or a mist condensing or reactive physical filter in the exit port 140. Alternatively, a U-shaped pipe 106 can be provide at the end of or before exit port 140 to collect and condense such mist.

FIG. 18A-E illustrates a variant of the stack vessel 102 and 103 within vessel 101. In this variant vessel 101 is cylindrical as are vessel 103 and 103. Vessel 102 and 103 have centrally disposed conduits 2118 and 3118 respectively that terminate in manifold for the entrance ports 218 and 318 that are generally disk or annular shaped and are optionally of a wider diameter than the conduits that direct the air to them. The entrance ports for the air below the fluid in these vessels are provided by orifices 2118o and 3118o, which are disposed about the perimeter of the potentially wider disk or annual portion at the end of the respective conduits. Vessel 102 is disposed above vessel 103, both being offset from the center of vessel 101. Any, all or some of the vessels and conduits illustrated in this and other embodiments can be cylindrical or rectangular, as well as have cross sections that are elliptical or curvilinear and combinations of the above.

The fan 10 drawings outside air to the conduit 1118 can be above the vessel 101 but could also inside the vessel 101, such as below the lid or top in the region with a dotted line boundary, denoted 10'. A power cord to fan 10 would have to go through the side wall or lid of vessel 101.

Preferably, one or more grates are disposed before the fan 10 or 10', or immediately after it to prevent gross debris from entering the apparatus 100.T Liquid or fluid levels in each vessel can be monitored and control manually using the dipsticks within tap ports 170, or an automated system operated by controller 205, that deploys sensors 106, pumps 105 and valves 105v could also be utilized in this variant of the apparatus 100, as previously described, which is applicable to all alternative embodiments.

As described in more detail in other embodiments, any of the vessels could deploy one-way valves 150, and the functions equivalent thereof, as we as could contain dikes 160 or other means to mitigate water vapor loss or spillage.

The packing 101p, 102p and 103p in each vessel is preferably reticulated foam with about 10 pores per inch reticulated foam, and should be set at a height where it is partially wetted by the bubbling action of the fluids As previously discussed with respect to FIG. 10B, the flow of air to be purified from the fans 10 or 10' down conduit 1118 the oil 121 surface in vessel 101 will form a shallow depression or crater in the center of the oil 121 that extends laterally past the lateral ends or side of the entrance port 118. Large particles are thus trapped in the oil 121 and the air will rise and continue exit port 131 to the enter the conduit 2118 that is open at an upper portion of the sidewall of vessel 102. Vessel 102 has an exit port 231 on an adjacent portion of the sidewall, which is the start of conduit 3118 to the orifices 3118o at the bottom of vessel 103.

Any, all or some of the vessels and conduits illustrated in this and other embodiments can be cylindrical or rectangular, as well as have cross sections that are elliptical or curvilinear and combinations of the above.

Figure 18A:
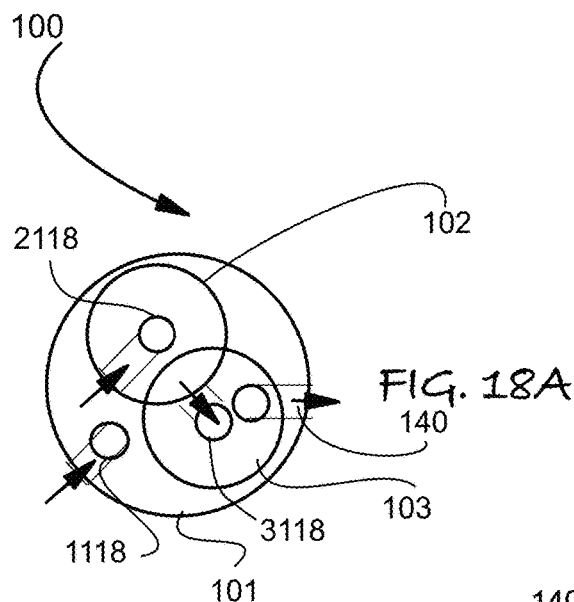
Figures 18B, 18C, 18D:
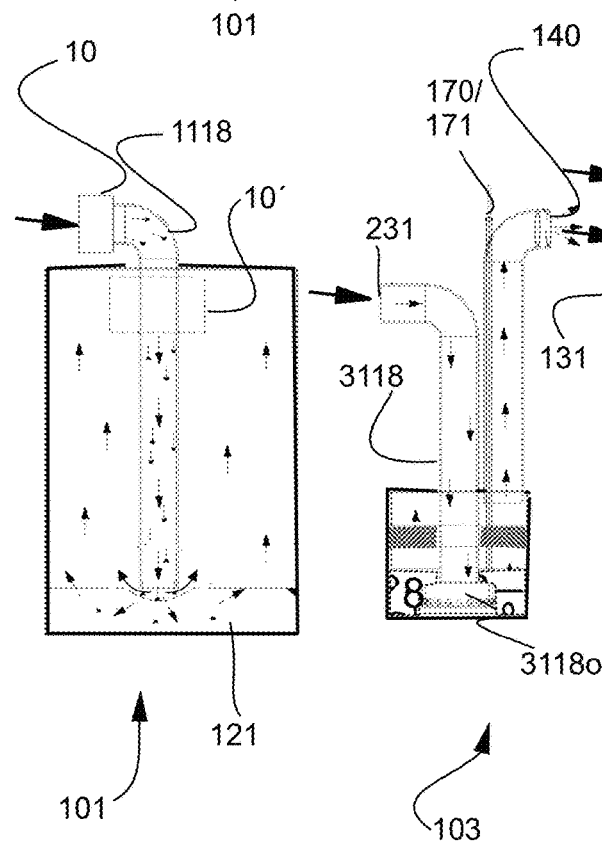
Figure 18E:
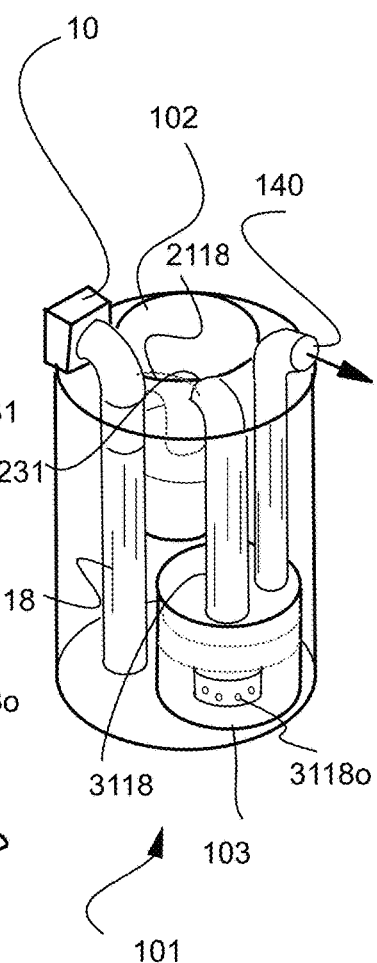

As in other embodiments, any of the nested and stacked vessel 101-103 of FIG. 17-18E can also have a bottoms or bases that are rectangular, round, elliptical or any combination of closed geometric forms that have linear or curvilinear bases and upright walls.

Figure 19:
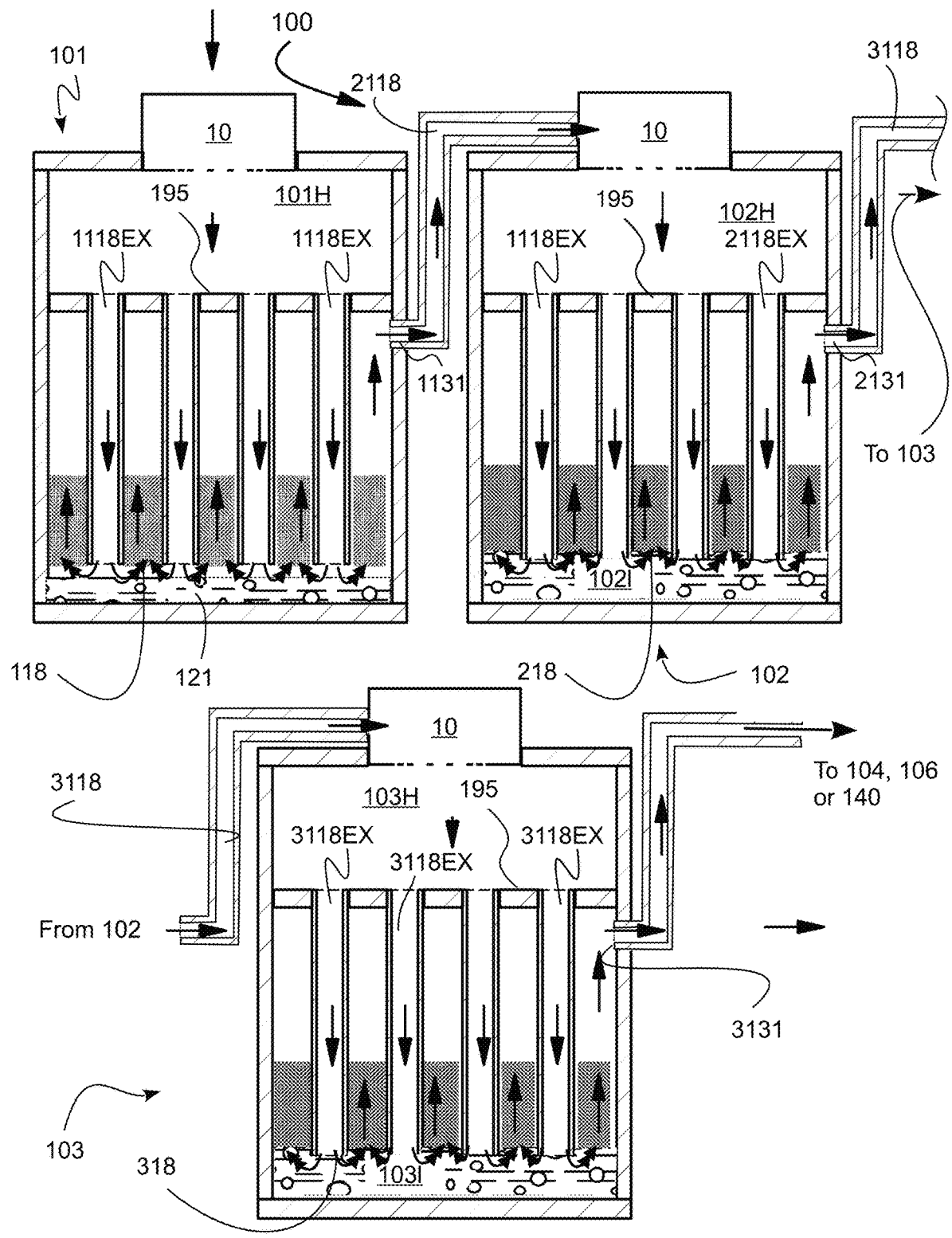
FIG. 19 is a cross-sectional elevation view of another alternative embodiment.

FIG. 19 is a cross-sectional elevation view of another embodiment in which at least some of the vessels 101-104 contain multiple portions 1118Ex, 2118Ex and 3118EX of conduits 1118, 2118 and 3118 respectively so that the vessels can contain more oil and/or fluid to provide a larger air purification capacity and or increased absolute purification levels for heavily contaminated air. If vessel 104 is deployed and similarly scaled, then multiple portions of conduit 4118 that can be scaled in quantity to utilize a larger volume of fluid 104l.

While the experimental apparatus depicted in FIGS. 4 and 5 was configured at the physical size sufficient in volumetric purification rate and capacity to clean the air in a single, small room per the standards of the EPA Wildfire Challenge, the configuration of the apparatus in FIG. 19 permits larger purification capacities using the discoveries of the various innovations described above. To upscale the size and capacity of the apparatus 100, the size of the vessel may be increased to contain an increased quantity of the reactive fluids with corresponding increase in fan size to increase CFM of air to be purified. The same features and dimensions of other embodiments may be maintained in the larger unit, according to the ratio and proportions in the smaller embodiments of the apparatus 100.

The vessels 101-103, and optionally 104, may be of any size, and shape, but a readily available, appropriately sized reaction vessel would be either 30-gallon drums or 50-gallon drums, depending on the desired CFM of air flow provided by one or more fans 10. The portions of the conduits 1118, 2118 and 3118 now deliver air to multiple entrance ports 118, 2118 and 3118 to the fluid in each vessel disposed each the end of tubes 1118EX, 2118EX and 3118 EX. tubes The open upper end of the tubes 1118EX, 2118EX and 3118 EX are connected in fluid communication to receive air via the holes in a plenum plate 195. The plenum plate 195 is disposed below the top of each vessel to define a head space 101H, 102H or 103H at the top of each vessel which receives air from a fan 10, or the exit port of the prior vessel deployed in the process 1000 as in other embodiments.

This number of holes in the plenum plate 195 may be determined by continuing the ratio of 1.25" (31 mm) tube diameter to 4" (100 mm) inner diameter vessel of the vessels in other embodiments. Hence, each of the separate entrance portion of each tube will be able duplicate the mass flow of air with comparable size bubbles and hence reaction rates of the air in the bubbles at the bubble-fluid interface as well as the air-liquid interface reaction rates within the packing. For example, the preferred 4:1 ratio of outer vessel inner diameter to conduit diameter is largely maintained by separating the circa 1.25" (30 mm) conduit portions 1118EX, 2118EX and 3118 EX from the same components by about 8" (200 mm), using either rectangular or hexagonal close packing in the horizontal plane.

High Density Polyethylene Plastic, HDPE, is the preferred material for construction of the vessels 101-103, and optionally 104, due to their impervious nature to caustic chemicals used. Stainless steel vessels would be acceptable containers, but HDPE is preferred to reduce costs.

Taking a HDPE drum one may fabricate these embodiment by drill 20 equidistant holes in the top or lid of a drum of a 30 gallon drum or 30 equidistant holes in a 50 gallon drum, each 1.25" in diameter, to fabricate the plenum plate 195 to accommodate multiple tubes 1118EX, 2118EX and 3118EX that will penetrate the lid and extend to the bottom of the vessel with the same design of bubbling orifices 1118o, 2118O, 3118o and optionally 4118o and porous media or packing 101p, 102p, 103p and optionally 104p, as the more compact embodiments in which the vessel has an inner diameter of about 4" inches (100 mm) to contain the fluid about the orifices that provide the exit port of each conduit.

A similar or same sized drum can have the sealed bottom removed and then inverted to be connected in sealed in attached to the perimeter of the top of the drum that provides the plenum plate 195, to provide the head space 101H-103H.

Holes in the top and sides of the drums can be formed to attach the fan(s) 10 and to provide the exit port to each vessel for attaching portion of the conduit that connects to the head space of the next vessel. This will increase the CFM air flow by either 20 times or 30 times over the smaller device, equal to an amount of flow sufficient to clean the air in an entire residence or large commercial building.

The conduits connecting exit ports of each vessel to the head space of the next vessel can be fabricated with rectangular, conventional sheet metal ducting commonly used in residences and commercial buildings, as well as with round plastic pipe (such as polyethylene or polyvinyl chloride pipe) as well as round metal pipe of varying diameters.

While FIG. 19 illustrates a fan 10 on each vessel, if vessel 104 is deployed it may also optionally deploy a fan in a similar manner before the exit port 140, and a U-shaped tube 106 may be used with or without vessel 104.

It should be appreciated that the packing materials in each vessel may be the same or different, and it may be desired that some vessels have larger or smaller volumes than others, and/or different volumes as well as types of packing materials to adapt to cleaning air having diverse types of contamination. Further, a separate fan may be deployed on each vessel above the exit port, or some of the vessels, to remove partially purified air from the vessel and force the air into the conduit to deliver the air below the fluid at the entrance port to the next vessel.

While the various embodiments provide several alternative methods of preventing spills if the vessel or apparatus 100 is tipped accidentally to a horizontal orientation, such as one way flow valves and spill retaining chamber, this can also be achieved by limiting the fill level in each container to that it is tips the fluid can flow laterally be never reach the air exhaust outlet leading to next vessel. This can be accomplished with the concentric disposition of the tube or channel directing air into the fluid when the fluid fills well less than half the volume of the vessel (unless check valve or the equivalent are deployed) and the air outlet is concentric with the top of the vessel so the fluid cannot rise to its level. For example, in the embodiment of FIGS. 7A and 7B, the conduit 3118 and exit port 313 have about the same diameter, so the maximum volume should be such than when the vessel 103 is tipped, the fluid therein 103*l*, does not reach up to exit portals 2131, 3131 and 4131.

Figure 15:
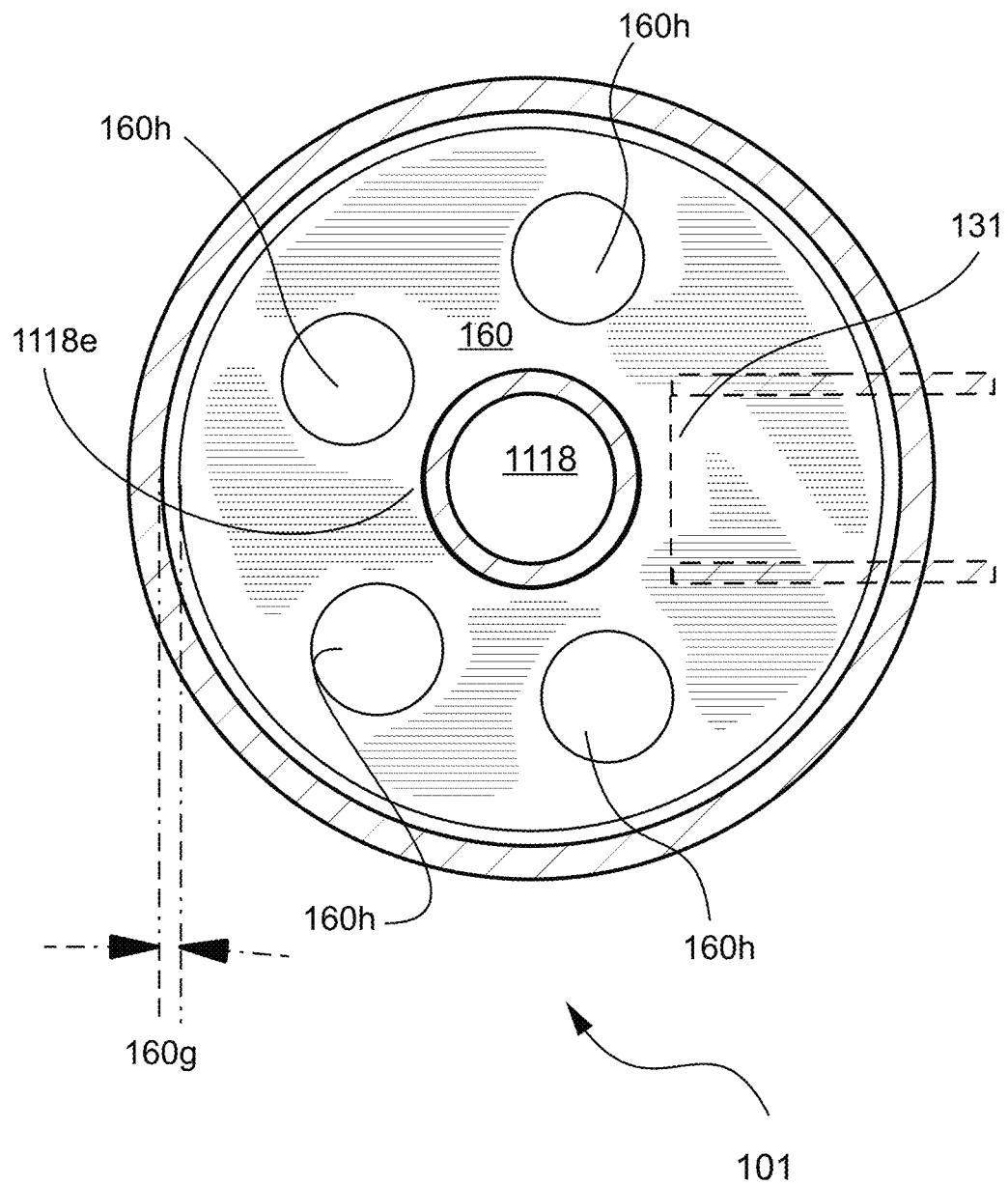
FIG. 15 corresponds to the section marker in labeled 15-15 in FIG. 10A

It should be noted in the embodiment of FIG. 11, since the fan 10 may be disposed on the top of vessel 101 to connect to conduit 1118, the exit port 131 for air purified by the oil or oil mixture 121 is on the side adjacent the top. However, the pipe that defines the exit port 131 extend into the vessel 101 close to the central conduit 118, so that the oil cannot enter it, as the volume of oil is less than the volume with this region. FIG. 15 also illustrates in cross section plan view the location of the holes 160*h* for the discs 160 with respect to the exit port 131. The region of the disc 160 immediately below the pipe with the exit port 131, about ⅓ of the circumference of the disc 160, does not have holes 160*h*. The holes 160, which can be more or less than the 4 illustrated, are disposed in the remaining ⅔ portion, to that the oil or oil mixture 121 that passes through the holes 160 if it surges due to a rapid tip, will still have a path to settle down before the surge progresses as a wave that can enter the exit port 131 of vessel 101, as well as flow into the fan 10.

It may also be possible to include various devices and materials as one-way valves 150. If an electromechanical a tip detector is provided that can de-energize the fans 10 immediately on detecting a pre-determined deviation from the ideal upright positions, then pliable silicone membranes can be used as one way or check valves 150, as they require a pressure differential from the fans 10 to open but would close to fluid and air flow in both directions when the air pressure is reduced.

Another means to prevent fluid flow between vessels or tipping is to deploy a plastic film construction that allow air to flow in both directions but stop liquid flow in at least one direction. Such films may provide the functional equivalent of check valves 150. One variety of such films is known as an aperture film, which has convoluted opposing top and bottom surfaces that comprise an array of small cones truncated above the base, each cone or similar tapering shaping having a circular or elliptical orifices, holes or apertures that point toward the direction intended to block fluid. Air can flow in both directions but fluid flows only through the larger opening in the cones, as capillary forces preclude the entry of fluids into the cones from the smaller aperture at the top. Thus, by placing such structured plastic film 163 on or clamped between perforated discs utilized as discs 162 but spanning to the inside wall of the vessel wall and eliminating gap 160*g*, with the cones pointing down. Such aperture films are disclosed in the following US Patents, which are incorporated herein by reference: U.S. Pat. No. 7,601,414 (issued to J. W. Cree et al. on Oct. 13, 2009) and U.S. Pat. No. 3,929,135 (Issued to Thompson, H. A. on Dec. 30, 1975).

Figure 16A:
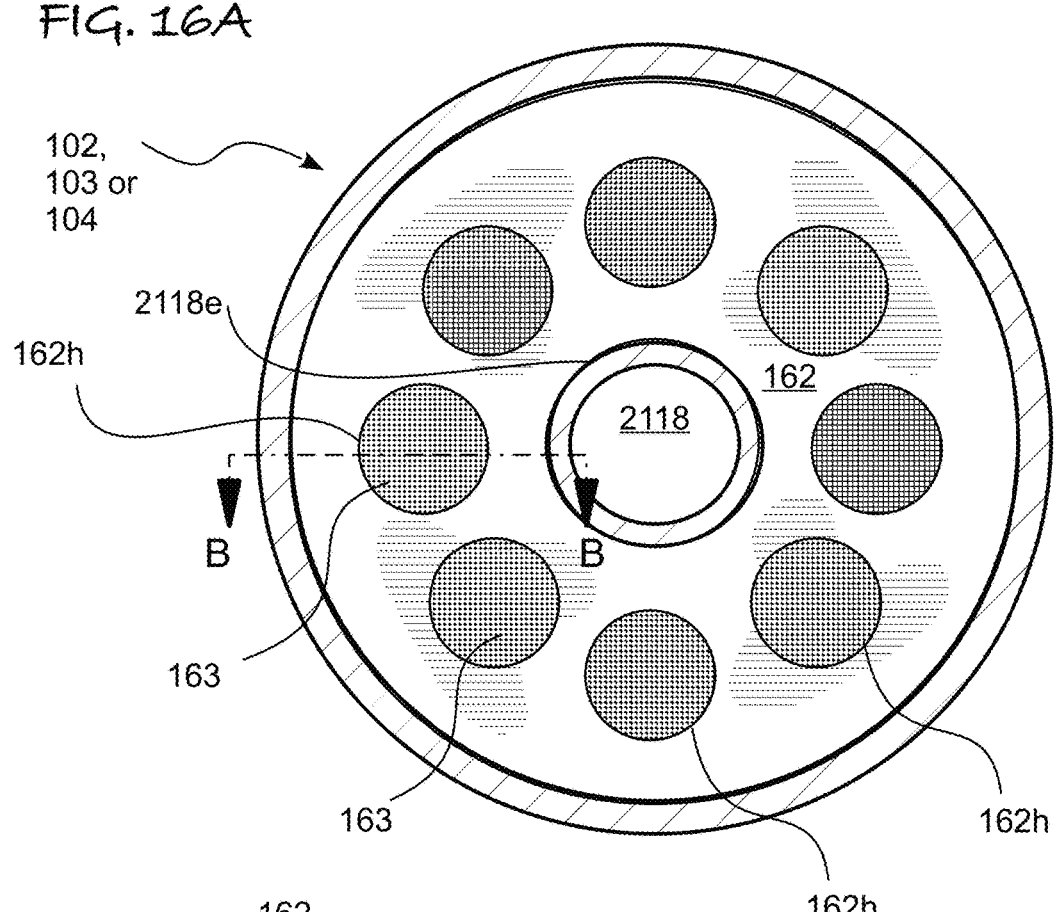
Figure 16B:
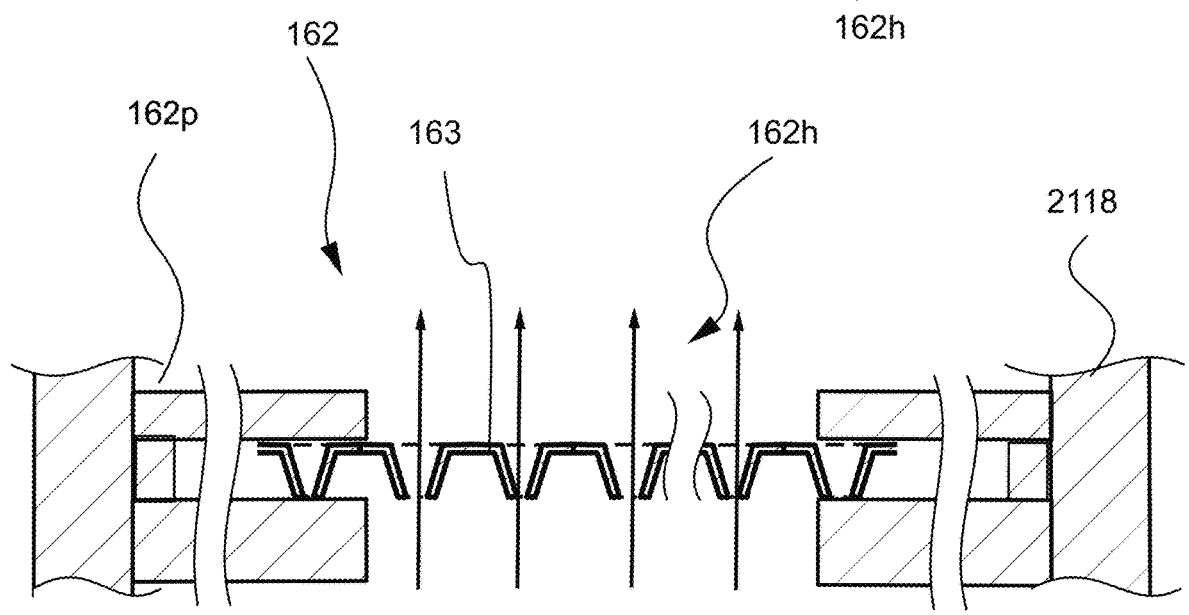
FIG. 16B is a schematic expanded cross-sectional elevation view at section line B-B in FIG. 16A.

FIGS. 16A and 16B illustrate this further aspect of the innovations in which one or more disks 160 may be replaced with a disk like member 162 having an upper member 162*u* and lower member 162*l* which are clamped, welded, or fused together such than the aperture or comparable plastic film 163 spans the common gaps or holes 162*h* in the upper and lower member. The perimeter 162*p* of the disc 162 may extend and connect with the interior wall of the vessel, as illustrated in FIG. 16B. The upward pointing arrows in FIG. 16B show the direction of air flow through the cones, in which liquid flow would be not occur if the vessel(s) were to tip or tilt sideways. Such films 163 with apertured cones can be similarly supported in other channels, pipe, tubes, passages, or conduits where fluid could accidentally flow in an unintended direction within the apparatus 100.

It should be appreciated that while the preferred embodiments of the apparatus 100 and process 1000 deploy non-toxic chemical ingredients or components, it may be desired in larger capacity apparatus to deploy functionally equivalent compounds that may be more toxic or hazardous. Any alternative chemical compounds or materials may offer cost or efficiency advantages, and larger air purification capacity units may enjoy service by well trained personal that would use adequate safety precautions, as such an apparatus 100 can fully deploy check valves 150 and appropriate sensors and controllers to mitigate potential safety hazards.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. A process for remediating contaminated air, comprising the steps of:
   a. forcing contaminated air into an oil filter,
   b. directing the air that exits the oil filter into an alkaline fluid,
   c. directing air that exits the alkaline solution into a catalytically active fluid that contains colloidal gold nano particles (AuNPs) dispersed in an alkaline aqueous solution, wherein at least partially purified air exits the catalytically active fluid.

2. The process for remediating contaminated air according to claim 1 in which contaminated air is forced into the oil filter by a first fan and the alkaline components of air that exits the catalytically active fluid are one of removed or neutralized and then dispersed by a second fan.

3. The process for remediating contaminated air according to claim 1 in which the oil in the oil filter comprises a mixture of oils selected from the group consisting of food grade oils, unsaturated oils, monounsaturated oils, sesame, flaxseed, hemp, canola, olive, avocado, peanut oil, and safflower oil.

4. The process for remediating contaminated air according to claim 1 in which the alkaline fluid comprises a slurry of one of hydroxides, oxides, carbonates and bicarbonates of magnesium or calcium in water that is buffered by at least one water-soluble organic acid.

5. The process for remediating contaminated air according to claim 1 in which the alkaline components of air that exits the alkaline solution are neutralized by an acidic solution that comprises at least one acid organic acid selected from the group consisting of citric acid, malic acid, tartaric acid, and ascorbic acid.

6. The process for remediating contaminated air according to claim 1 in which the oil filter is operative to remove particulates that contact oil in the filter and the oil is operative to dissolve volatile organic compounds from said particulates and air that at least one of;

a. percolates the air as bubbles through the oil and,
b. passes the air through a porous medium that is at least partially covered by a film of the oil.

7. The process for remediating contaminated air according to claim 1 in which air entering the alkaline fluid and the catalytically active fluid percolates as bubbles through each of the fluids and air that emerges from the fluids as bubbles that have coalesced then passes through a porous medium at least partially covered by each fluid.

8. The process for remediating contaminated air according to claim 1 in which the catalytically active fluid comprises at least some AuNPs that are not agglomerated and have a particle size between about 10 nm to about 30 nm and a colorimetric pH indicator.

9. The process for remediating contaminated air according to claim 1 in which the alkaline fluid is contained in a first vessel and the catalytically active fluid is contained in a second vessel and at least one of the first and second vessels is configured with one or more sensors to determine one of the pH and fluid level in the vessel and in which at least one reservoir contains a second fluid in which at least one pump is in fluid communication with the reservoir and the vessel via a controller in signal communication with the one or more sensors, in which the controller is operative to energize the at least one pump to withdraw the second fluid from the reservoir to adjust one of the pH and fluid level in at least one of the first and second vessels.

\* \* \* \* \*